(12) United States Patent
Myr et al.

(10) Patent No.: US 7,379,890 B2
(45) Date of Patent: May 27, 2008

(54) SYSTEM AND METHOD FOR PROFIT MAXIMIZATION IN RETAIL INDUSTRY

(75) Inventors: David Myr, Jerusalem (IL); Eugene Grechanovsky, Jerusalem (IL); Yuri Kazarinov, Ashdod (IL)

(73) Assignee: Makor Issues and Rights Ltd., Jerusalem (IL)

( * ) Notice: Subject to any disclaimer, the term of this patent is extended or adjusted under 35 U.S.C. 154(b) by 506 days.

(21) Appl. No.: 10/688,018

(22) Filed: Oct. 17, 2003

(65) Prior Publication Data

US 2005/0096963 A1 May 5, 2005

(51) Int. Cl.
*G06F 17/30* (2006.01)
(52) U.S. Cl. ...................................... 705/10
(58) Field of Classification Search ............... 705/10, 705/400
See application file for complete search history.

(56) References Cited

U.S. PATENT DOCUMENTS

| | | | |
|---|---|---|---|
| 5,521,813 A | 5/1996 | Fox et al. | |
| 5,596,493 A | 1/1997 | Tone et al. | |
| 5,712,985 A | 1/1998 | Lee et al. | |
| 5,987,425 A | 11/1999 | Hartman et al. | |
| 6,029,139 A * | 2/2000 | Cunningham et al. | 705/10 |
| 6,076,071 A | 6/2000 | Freeny, Jr. | |
| 6,078,893 A | 6/2000 | Ouimet et al. | |
| 6,094,641 A | 7/2000 | Ouimet et al. | |
| 6,138,105 A | 10/2000 | Walker et al. | |
| 6,397,199 B1 | 5/2002 | Goodwin, III | |
| 6,553,352 B2 | 4/2003 | Delurgio et al. | |
| 7,092,918 B1 * | 8/2006 | Delurgio et al. | 705/400 |
| 7,092,929 B1 * | 8/2006 | Dvorak et al. | 705/28 |

(Continued)

FOREIGN PATENT DOCUMENTS

JP 2000-357186 A * 12/2000
JP 2001-331691 A * 11/2001

OTHER PUBLICATIONS

Pauwels et al. "The Long-Term Effects of Price Promotions on Category Incidence, Brand Choice, and Purchase Quantity." Journal of Marketing Research, vol. XXXIX, pp. 421-439, Nov. 2002.*

(Continued)

*Primary Examiner*—Susanna M. Diaz
(74) *Attorney, Agent, or Firm*—RatnerPrestia

(57) ABSTRACT

A computer-based method and system accomplish automatic optimization of a preferred merchandising figure of merit like revenue, profit, etc. by concurrent optimization of prices and in-store promotion schedules for groups of interrelated products in a supermarket or in a chain of supermarkets. The basis of the system is a statistical model that combines effects of prices, promotion schedules and other factors that could influence demands, and produces a flexible nonparametric predictive demand function that can be optimized simultaneously in prices and promotion schedules. The system generates demand predictions for groups of interrelated products by applying data mining procedures to historical database that contains sales data along with various sales conditions, adjusting statistical predictive demand models, and then optimizing them in prices and promotion schedules. The user can interact with the system by selecting and customizing optimization and prediction scenarios provided by the system, and by requesting customized reports with results of particular optimization and prediction schemes.

38 Claims, 14 Drawing Sheets

U.S. PATENT DOCUMENTS

| | | |
|---|---|---|
| 2002/0065699 A1 | 5/2002 | Talluri |
| 2002/0099678 A1 | 7/2002 | Albright et al. |
| 2002/0107819 A1 | 8/2002 | Ouimet |
| 2002/0120492 A1 | 8/2002 | Phillips et al. |
| 2002/0123930 A1 | 9/2002 | Boyd et al. |
| 2002/0147767 A1 | 10/2002 | Brice et al. |
| 2002/0156663 A1 | 10/2002 | Weber et al. |
| 2002/0156858 A1 | 10/2002 | Hunter |
| 2002/0165756 A1 | 11/2002 | Tobin et al. |
| 2002/0169654 A1 | 11/2002 | Santos et al. |
| 2002/0169657 A1 | 11/2002 | Singh et al. |
| 2003/0028437 A1 | 2/2003 | Grant et al. |
| 2003/0065555 A1* | 4/2003 | von Gonten et al. ......... 705/10 |
| 2003/0110072 A1 | 6/2003 | Delurgio et al. |
| 2004/0002900 A1* | 1/2004 | Cohen et al. ................. 705/26 |
| 2004/0049470 A1* | 3/2004 | Ouimet ....................... 705/400 |
| 2004/0210543 A1* | 10/2004 | Ouimet ....................... 705/400 |
| 2004/0267676 A1* | 12/2004 | Feng et al. ................. 705/400 |

OTHER PUBLICATIONS

Achabal et al. "A Decision Support System for Vendor Managed Inventory." Journal of Retailing, vol. 76(4), pp. 430-454, Winter 2000.*

Efron, B., et al., *An Introduction to the Bootstrap*, pp. 45-49 and 124-127, Chapman and Hall (1993).

Gupta, D., et al., *A Pricing Model for Clearing End of Season Retail Inventory*, Univ. of Minnesota (2002).

Hjorth, U., *Computer Intensive Statistical Methods*, pp. 38-45, Chapman & Hall, London (1994).

* cited by examiner

SYSTEM AND METHOD FOR PROFIT MAXIMIZATION IN RETAIL INDUSTRY

BACKGROUND OF THE INVENTION

1. Field of the Invention

This invention relates to systems and methods that use point-of-sale data for optimization of prices and promotion schedules for groups of interrelated products with the purpose of maximization of a preferred merchandising figure of merit like revenue, profit, etc.

2. Background and State of the Art

Businesses commonly and supermarket chains in particular, use various promotional and pricing schemes to improve revenues, profits and sales volumes. For instance, a supermarket manager may adjust prices to encourage sales of particular products. Also, he may specially present or advertise the products to increase consumer awareness and demand. Because of the variety of promotion discounts often applied at any one time, the complexity of the market, and difficulties in understanding of customer response, it is usually very difficult to accurately forecast effectiveness of various promotional tools and price adjustments, and to evaluate the influence of each selected tool on the overall sales revenues. It may still be even more difficult to plan various marketing campaigns and pricing adjustments beforehand to achieve the overall business optimality. Since predicting and assessing the consequences of various pricing and promotion strategies in a reliable manner is beyond the capabilities of the unaided human mind, there have been developed a number of approaches and computerized systems for dealing with the arising problems.

Commercially available inventory management systems such as the Maxagrid system include a yield management system which produces a pricing forecast used to determine prices for sales based on factors such as past trends and performance data which are updated periodically in order to maintain an accurate pricing model. The user making promotion and pricing decisions is faced with the following problems: connecting various promotion tools and prices with resulting sales in the past (for which construction of statistical models is necessary), isolating additional factors (many of which may be outside of decision-maker's control) that could influence sales volumes, developing statistical tools for predicting future demands, optimizing model parameters that will render optimal sales, performing necessary adjustments in promotions and prices.

The range and severity of the accompanying problems could be glimpsed from the following incomplete list:

1. Historical data available is usually insufficient, incomplete and often may appear contradictory. Relying on older data improves observations to parameters ratio but raises the questions of data relevancy for the current situation. Missing and outlying observations do not make life easier.
2. Isolating useful observable relevant factors, beyond promotions and prices, is a difficult task in itself.
3. While prices make a single most important factor, promotion effects are much less pronounced, interdependent, sometimes contradictory and confusing.
4. Especially complex are promotion effects for products with substitution demand and complementary demand. For example, offering one product at a discount might cannabalize sales from another product, and ultimately fail to yield greater revenue or greater profit. It is even more difficult to evaluate effects of promotions that pair more than one product.
5. Clearance sales of selected products, so often employed by department managers, may effect demand for substitute products in unpredictable ways.
6. The estimated optimal values of prices may be incompatible with overall management goals and therefore unacceptable.

The system and method in the present invention have been constructed with explicit purpose of solving these and many other problems arising in the process of optimizing joint pricing and promotion influences on the overall figure of merit, such as revenue, gross margin, etc. Detailed description of our invention is given in the following sections, while in the remainder of this section we list most relevant existing inventions, and pinpoint their major differences from our invention.

U.S. Pat. No. 5,596,493 (Tone, et al., 1997): It is an early work describing a complete statistical demand model suitable for prediction of sale amounts based on historical database. Log-normal linear regression model of demand is used. Besides demand prediction, regression model is used for purposes of determining safe stock, restocking, etc. Suggested possible relevant regressors include days of week, weather, prices and various categories of advertisements. The problem of selection of relevant regressors is addressed, as well as probabilistic measures of model uncertainty due to numerous sourced of error. The method for ordering for restocking is proposed that comprises the steps of entering POS data, finding sale amount data of individual goods for a predetermined time period obtained on the basis of the POS data, calculating basic statistical values of daily sale amounts of the individual goods based on the sale amount data of the individual goods, classifying the basic statistical data into one of plural class types, estimating the sale amount in accordance with the class types and calculating the amount of a restocking order based on the estimated sale amount and an amount on stock. The system for classifying sale amount characteristics comprises means for entering POS data, means for finding sale amount data of individual goods for a predetermined time period obtained on the basis of the POS data, means for calculating basic statistical values of daily sale amounts of the individual goods based on the sale amount data of the individual goods, and means for classifying the basic statistical data into one of preset plural class types.

Like most later patent applications, the model in our invention uses some of ideas of the present invention while making considerable additions and refinements, and developing sophisticated statistical tools for comparative assessment of influences of various factors on demand levels. For instance, our system is capable of direct estimation of promotion effects of various clips run on in-store monitors, and of estimating comparative efficiency of those clips. Also, it integrates influences of pricing and promotion into a single system and uses it for optimization of both prices and promotion schedules simultaneously.

U.S. Pat. No. 5,712,985 (Lee, et al., 1998) is a continuation in part of U.S. Pat. No. 5,459,656. The invention provides a system and method for analyzing business demand which incorporates tracking of past business demand for a plurality of products or tasks, time intervals during the day, and providing improved projection of business demand for such items. The system uses the concept of a business influence to aggregate, store, access, and manipulate demand data for the purpose of forecasting future demand levels for one or more business items. A business influence is any type of quantifiable factor that produces a variation in demand for some type of business item. The business influences model is composed of three distinct entities: a base profile, at least one influence profile, and a forecast profile. The base profile, influence profiles, and forecast profiles are data storage structures that persistently maintain their associated profile information in selected files in a database. The profiles are time-demand curves where demand is represented as either quantity or percentage units. An influence profile reflects the changes in demand for a business item due to a particular identifiable condition, such as the weather, or a sale, or the like. Influence profiles are selected and combined with the base profile to create a forecast profile. The base profile and influence profiles are demand curves representing a particular level of demand for a business item in each of the number of time intervals. Seasonality influence profiles may also be created to represent the influence of long-term seasonal influences. The forecast profile is a projection of anticipated demand for a business item based on its base profile and any selected influence profiles or seasonality profiles, for a selected period. The selected period may be any useful time period, such as a business quarter, month, week, day, hour, minute, and so forth. In order to project demand then, a base profile for a selected business item is combined with any number of influence profiles to create a forecast profile. The user selects a business item to be produced or scheduled during some time interval. The selection of a business item, and subsequent forecasting may be repeated for multiple business items. The user selects a base profile for the business item and any number of influence profiles. In a preferred embodiment the business item is associated with a base profile, and selected influence profiles, so that selection of the business item results in automatic selection of the profiles. In a preferred embodiment, each business day is associated with at least one base profile and influence profile that captures the variations in demand patterns which effect each demand for a business item associated with the base profile. In the preferred embodiment, the base profile stores a historical exponentially smoothed average of actual demand for the item in each of a variable number of time intervals. In alternative embodiments, the base profile stores a moving average of actual, a forward trend average, or other types of historical averages.

From the given description of the invention, it is not quite clear how it differs from a standard statistical approach of setting-up a regression model, estimating model parameters, and updating the whole process as new data arrive. The regression model need not be linear: it may be a locally weighted regression, or a generalized additive model, or whatever. Such an approach adopted in our own patent application would use well-developed tools for weighting, updating, estimating statistical properties of the available data, etc. It could work automatically, i.e. without user's intervention, or provide an opportunity for interaction.

U.S. Pat. No. 5,987,425 (Hartman, et al. 1999) describes a variable margin pricing system that generates retail prices based on price sensitivity and cost, and allows dealers more flexibility and control over the retail pricing of the products. After receiving electronic information identifying a plurality of products and electronic product cost information, the customer price sensitivity, and logical relationships between gross profit margins and the customer price sensitivity, are determined for the products. The system electronically assigns varying margins to the products based on the logical relationships between margins and the customer price sensitivities. Retail prices for each of the products are then electronically generated, as determined by the cost information and the assigned margins for each of the corresponding products. In short, the system ranks products by their dollar costs and assigns smaller gross profit margins to products with higher costs because of higher price sensitivity of consumers to such products. This assignment is based on ready-made formulas that can be modified from expert knowledge. This invention can be seen as computerization of earlier manual optimization of variable price margins based on expert assessments and comparisons with competitors' prices. The described invention differs considerably from our invention in which pricing and promotion are optimized in the framework of a constructed statistical model and estimated using historical database and data mining tools.

U.S. Pat. No. 6,029,139 (Cunningham, et al. 2000) describes a system and method of evaluating and optimizing promotional plans for products, segments of products or categories of products. The promotion optimization system determines both the costs and the benefits of a proposed promotion plan for the sale of products. Using both costs and benefits, it proposes a promotional plan that will better meet the user's goals. This may involve new promotion plans or existing promotions scheduled at different times. Another option may be the coordination of promotions between two related segments of products, i.e. groups of products that may be promoted together. Each product has an associated sales history and manufacturer. Neural networks are used for processing the corresponding data structures. Sales objectives and constraints are applied to neural networks generating promotional plans for product segments.

Since the cited patent application does not go into description of statistical techniques for processing historical data, it does not easily render itself to comparisons. Still, it is clear that it does not contain modern data-dependent means for assessing efficiency or inefficiency of promotional plans that may depend on huge number of parameters, and in particular it does not provide means for estimating efficiency of in-store monitors carrying promotion clips which is suggested in our own patent application. Its estimation structure appears fixed in that it does not provide means of integration of large numbers of various factors like different forms of promotion schedules, pricing plans, time-dependent structures, etc. into a common estimation system capable of sorting out partial influences of various factors on cumulative product demand. Furthermore, it is well known that neural networks are not useful for isolating influences of multiple factors operating simultaneously in different directions. At the same time, it can be seen from the description of our own work that isolating influences of different factors is extremely important for effective optimization of promotion and pricing effects simultaneously.

U.S. Pat. No. 6,076,071 (Freeny, Jr., 2000) describes an automated product pricing system including a physical store system, a virtual store system, and a control system. The physical and virtual store systems transmit sales data indicative of the number of sales of respective products. The control system receives the sales data from the physical store system and the virtual store system, and generates price change data including a changed price of an identified product based on the sales data received from at least one of the physical and virtual store systems. The price change data is then transmitted by the control system to at least one of the physical and virtual store systems to thereby change the price of the identified product. Thus, the system communicates advertising price change codes indicative of different advertised prices, i.e. it is capable of price optimization. On the other hand, although it handles advertising, it does not have means for assessing efficacy of different methods of advertising, neither means for sharing out a cumulative demand increase to various sources of advertising. By implication, it cannot estimate sources of demand variability and cannot simultaneously optimize pricing and advertising.

U.S. Pat. No. 6,078,893 (Ouimet, et al., 2000). In this invention, the user selects a demand model and a market model. The market model describes how some of the parameters of the demand model behave according to external market information. The market model is derived by studying prior sets of sales histories and determining an empirical relationship between the sales histories and the parameters of the demand model. The user first selects a consumer demand model to be tuned to the sales data. Consumer demand models are known in the art, and in a preferred embodiment, the user will be provided with a database of predefined demand models from which to choose. The user will also be given the option of defining a new demand model that can be tailored to meet the user's specific needs. Next, the user selects a market model, which describes how some parameters of the demand model are expected to behave according to external market information. He will be given a number of options for selecting a market model. In addition, the user can also be provided with a database of predefined market models, each corresponding to a particular demand model, from which to choose. In a similar fashion, the user is given a number of other options for making important decisions.

This model is very complex and contains a lot of elements that have to be fixed by the user to enable the system to work. Consider, for instance, selection of a market model that functions as a penalty function for the demand function. Such a selection is by no means a simple matter for an average user. Moreover, its parameters are to be estimated before it could be used in the system for modifying the demand function. Erroneous selection or estimation of a market model will result in an erroneous combined model, thereby ruining the initial demand function instead of correcting it. By contrast, in our own invention this problem is solved by restricting potential prices to an priori selected neighborhood of the current price in the pricing space. Such an approach does not require from the user to make decisions that he may be unwilling or unable to make.

U.S. Pat. No. 6,094,641 (Ouimet, et al., 2000). In this invention, the original demand model is modified to include a mechanism to convert actual prices into perceived prices, thus causing the demand model to predict higher demand for certain prices. The user specifies the function that converts from real prices to perceived prices. This modified demand function is then fitted to a sales history to yield the parameters appropriate to its particular form. Also, the demand model can be modified to account for promotional effects. The user defines a visibility model, which gives the relative increase in demand for an item caused by a promotion, and the cost of the promotion. The demand model is modified to include the effect of increased demand based on the visibility, and a profit model is modified to account for the added cost due to the added visibility. The profit model is then optimized with respect to both prices and promotions. Advertising is used in a general sense including newspaper ads, etc. Psychological effects include price thresholds, etc. Model selection refers, apparently, to a choice of the form of demand function. Although it ostensibly provides additional features to the user, it is hard to see how the user could make a meaningful choice between different forms of demand function. Even more problematic for the user may be the need for defining a visibility model that should give the relative increase in demand for an item caused by a promotion. Visibility model is suggested to be given by a table providing the relative increase in demand for an item at a given price vis-à-vis promotion. It is not clear from the text how this 'relative increase' is to be estimated. Model estimation called "tuning process" in the patent, includes also optimization and uses simulated annealing without any reasoning for its appropriateness.

U.S. Pat. No. 6,553,352 (Delurgio et al., 2000) describes a method for enabling a user to determine optimum prices of products on sale. The interface includes a scenario/results processor that enables the user to prescribe an optimization scenario, and that presents the optimum prices to the user. The optimum prices are determined to maximize a merchandising figure of merit such as revenue, profit, or sales volume. The optimum prices are determined by execution of the optimization scenario, where the optimum prices are determined based upon estimated product demand and calculated activity based costs. The patent contains extended arguments for optimizing product groups rather than individual products. Promotion optimization is dealt with in the co-pending patent application 20030110072. Detailed descriptions concern mainly interfaces, other parts are very short and do not present sufficient detail for implementing the methods as stated. In particular, the patent does not contain description of method for estimating target functions for optimization, nor methods of optimization, nor methods for estimating errors that contaminate the results.

US Patent Application 20020099678 A1 (Albright et al., 2002) describes a system and method for predicting and analyzing the consequences of a pricing or promotional action in a retail setting, and also for monitoring the actual result of marketing actions and communicating real-time or near-real-time information regarding the results. According to one aspect of the invention, a management tool links sales data and modeling algorithms to predict the results of pricing or promotion actions, thereby allowing a user to propose an action and view the predicted results. According to another aspect of the invention, the management tool monitors an implemented action and assesses the effect of the action on performance metrics. According to another aspect of the invention, users can select elements for a template for a web page displaying select company information, such as news, a scorecard showing pricing/promotion action results, the company's and/or its competitors' stock prices, current market capitalization and corporate PSP sales. Graphical user interfaces allow a user to easily interact with the underlying modeling applications to set a specified goal, to query the consequences of proposed actions to compare results from more than one potential action using selected performance metrics.

Despite these attractive features, the modeling system as described in patent application 20020099678 contains no clear method of integrating pricing and promotion influences into cumulative influence onto product's demand. In particular, it does not contain a means of simultaneous balancing of pricing influences that apparently are very strong with promotion influences that may be unreliable and sometimes negligible and statistically insignificant. Neither, does it contain means for assessing significance of promotion influences and deciding whether they warrant considerable changes of promotion scheduling in particular ways and directions. Next, although the system contains means for manipulating 'if-then' scenarios and queried proposed actions, it does not allow for optimization of prices and promotions by searching for optimal courses of action in the pricing-promotion space. Thus, on a number of important points, the system falls short of achieving the targets set up for the system described in our invention.

US Patent Application 20020123930 A1 (Boyd et al., 2002) provides a promotion pricing system for producing and evaluating promotion pricing strategies. In particular, a user may evaluate historical data to determine a promotional strategy to accomplish various business goals, such as increasing total sales volumes or increasing sales in certain desired market segments. The promotion pricing system can either propose a promotional strategy or evaluate the expected effect of a promotional policy provided by the user. The promotion pricing system works by defining market by specifying the various products in the market, as well as the suppliers and consumers. The promotion pricing system then looks to historical market data to create a market model which may be used to determine various information, such as profit or sales maximizing sales conditions.

The model is very general in that it is capable of using multiple sources of external information like data on market share of various products, data from competitors' transactions, etc. As always, however, generality comes at a price: much more of varied historical data are needed for reliable estimation of model's parameters and for testing for statistical effects. Also, optimization modules may face difficulties when trying to find solutions in high dimensional spaces. In contrast, the model in our invention can work with a bare minimum of historical data, i.e., with scanner data available in any computerized business environment. In addition, our system is capable of direct estimation of promotion effects of various clip series run on in-store monitors, and of estimating their efficiency or lack thereof while creating and monitoring promotion schedules.

US Patent Application 20030110072 (Delurgio et al., 2003). This patent application is related to co-pending application U.S. Pat. No. 6,553,352 and describes a method for enabling a user to determine optimum prices of products on sale. The interface includes a scenario/results processor that enables the user to prescribe an optimization scenario, and that presents the optimum prices to the user. The optimum prices are determined to maximize a merchandising figure of merit such as revenue, profit, or sales volume. The optimum prices are determined by execution of the optimization scenario, where the optimum prices are determined based upon estimated product demand and calculated activity based costs. Detailed descriptions concern mainly interfaces, other parts are very short and do not present sufficient detail for implementing the methods as stated. In particular, although promotion optimization is mentioned, neither method for estimating target functions for optimization, nor methods of optimization are given.

Our own previous invention described in US Patent Application no. 20030220830 A1: Method And System for Maximizing Sales Profits by Automatic Display Promotion Optimization, filed Apr. 4, 2002. The system in this patent application evaluates among other things, influences of various in-store promotion displays in a supermarket by using locally-weighted straight-line smoothers applied to historical data on demands in a database. A real time iterative optimization algorithm is used for calculation of optimal clip schedules. These functions are also present in our new invention in which they make part of the "promotion part" of the model. At the same time, the new model, or better say its "promotion part" is much more sophisticated and has a number of new features: it is not locally linear, is suitable for dealing with groups of interconnected products rather than with individual products, is provided with a learning algorithm for evaluating comparative efficiency of different promotion schedules, and some others.

BRIEF DESCRIPTION OF THE INVENTION

The present invention describes a method and system for automatic maximization of a preferred merchandising figure of merit like revenue, profit, etc. in a supermarket or in a chain of supermarkets. It enables the user to determine optimum prices and in-store promotion schedules for groups of related products based on predicted product demands. Demand predictions are produced by statistical prediction algorithms coupled with data mining procedures applied to historical database that contains sales data together with various sales conditions. Determination of optimal prices is initiated by the user on the per request basis by execution of optimization scenarios, while optimal promotion schedules are generated continuously in real time after initial options have been set-up.

Optimization scenarios are selected by the user from the library of optimization templates parameterized by input parameters and various options on the user's menu. The user's interface includes a scenario menu that enables him to select optimization scenarios or prediction scenarios including various input parameters, a means for interaction with the computation engine, and a report generator that presents optimum prices or predicted prices and accompanying relevant results in various formats. The system combines a rich store of optimization and prediction scenarios with real time information processing in which most recent data are merged into historical data acquired previously via interface with the system database.

A crude map of the system's functioning is presented in FIG. 1. At a preliminary stage, the system performs datamining of the existing historical database (Block 101): it accesses the historical database (Block 102) and applies data-reading and data-mining procedures that setup a secondary working database containing data relevant for regression modeling (Block 103). Later this secondary database will be updated and used continuously instead of the original database. The system's timeframe consists of two major periods: Initial Period and Main Period. It is assumed that at the Initial Period (Block 104), there are available sales data like scanner data for some previous time period, say, one or two years. Those data should include common sales conditions such as days of the week, holidays, etc., and basic sales information items like quantities, brands, prices, pointers for items being put on sale at clearance prices, etc. On the other hand, it is not assumed that detailed data on promotional activities have been stored in the database. Therefore, while prices could be optimized during that period, promotion schedules would be generated by the Initial Promotion Scheduling Procedure that does not require historical data on promotion activities. Subsequently, when sufficient sales data have been collected for the promotion optimization module to function properly, the potentially infinite Main Period starts (Block 106).

At all stages, the user can communicate with the system via User's Interface Module (Block 105) by selecting optimization or prediction scenarios and input parameters, and receiving customized reports with optimized prices, sales predictions and other relevant information of various degrees of detail (Block 107).

DETAILED DESCRIPTION OF THE INVENTION

Figure 1:
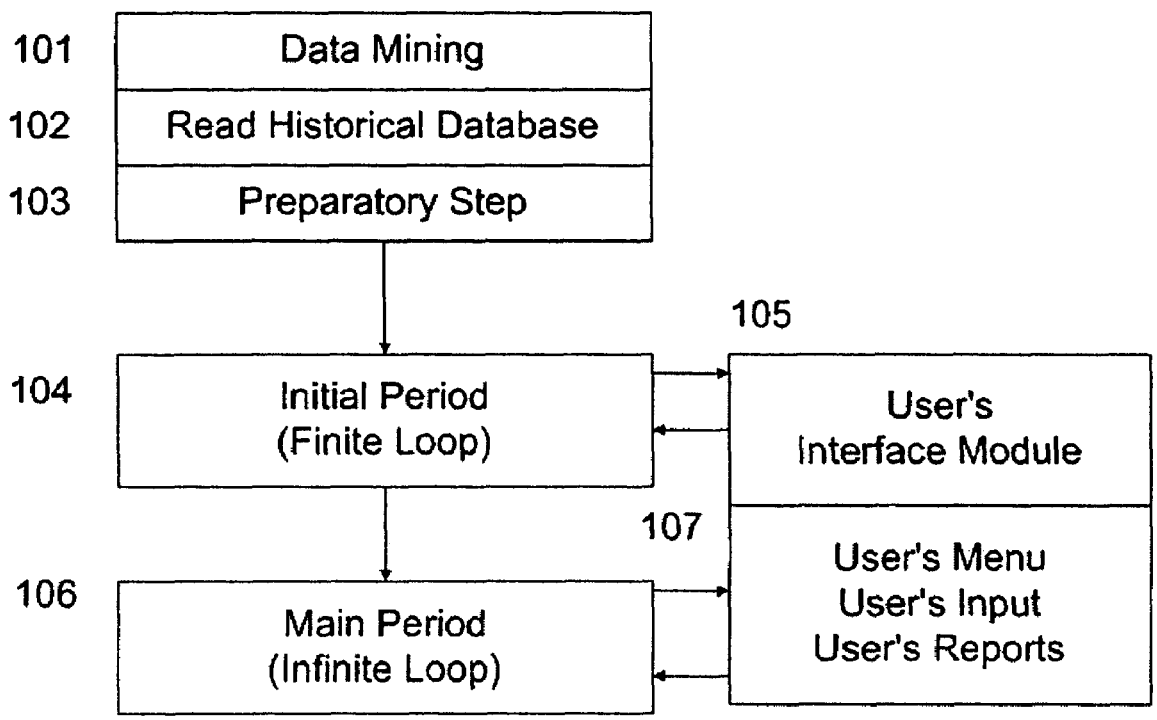
FIG. 1: Joint Pricing and Promotion System: Overview

This invention relates to the field of econometrics, and more particularly to a system and method for determining optimum prices for a set of products within a product category in a store, where the optimum prices are defined as the prices that maximize a merchandising figure of merit such as revenue, profit, or sales volume. Along with optimization of prices, this invention provides a means for concurrent demonstration of promotion clips on in-store monitors in such a way that joint influence of pricing and promotion is optimized.

For achieving these goals, the present invention provides flexible techniques for configuring optimization scenarios from the user interface, determining a set of optimum prices corresponding to the scenarios, and concurrent optimal clip demonstration scenarios, and displaying those optimum prices in a user-friendly form together with other relevant information of potential interest to the user.

We begin with an example.

EXAMPLE

Clearance Pricing Optimization Problem

Suppose it is decided to sell out a number of product items in a supermarket within a particular target time period called clearance period, and to maximize the total revenue during that period by setting up optimal prices (for a theory for clearance sales, see, for instance Gupta, Hill, and Bouzdine-Chameeva, 2002). Along with adjusting prices, it is possible to use other means for enhancing sales like mobilizing in-store advertising means.

It is assumed that historical statistical data like scanner data are available on sales of those items for past periods. Besides sales volumes, those data are presumed to include the corresponding price levels, some concurrent external conditions that could affect sales volumes, for instance, time characteristics like season, day of the week, holidays, and also such factors as special discounts, advertising activities, etc.

A simpler version of this example will be selling a single product whose revenue we wish to maximize during a prespecified clearance period, say, one week. The product will be on sale for one week at a markdown price after which the leftover stock is sold out at a very low price (salvage price) or returned for a low compensation.

First we give a general approach to solving suchlike problems in pricing optimization that includes data mining, regression model construction, regression fitting and estimation, objective function construction, pricing optimization, and error estimation. Then we describe a statistical-optimization system that uses measurements of in-store promotional activities stored in the database for the goal of optimal allocation of clip demonstration times at in-store TV monitors. After that we present an integrated statistical-optimization system that includes both pricing and promotion optimization subsystems and utilizes them for revenue optimization from sales of a category of products. Finally, we describe the user interface module that allows the user to select desirable optimization or prediction scenarios, feed input parameters and options into the system, and to receive customized reports with optimal prices, predicted values and other information.

Assume that the product's weekly revenue R is a known function of its price p and weekly demand y:

$$R=R(p,y) \quad (1)$$

Assuming that the product's demand is stochastic but can be adequately modeled by a price-demand function known up to parameter values, we can construct a regression model relating the weekly demand to product's price and a number of other relevant factors. Using historical sales data, we can estimate model parameters, and obtain a demand prediction function $$y=y(p,g) \quad (2)$$

where g is the vector of other relevant factors. Substituting equation (2) into (1) and suppressing the dependence on the known vector of other factors, we can write the revenue as a function of price alone:

$$R=R(p) \quad (3)$$

Direct maximization of revenue R in (3) is not possible since it is random; instead, we will work with its mean value $$\bar{R}=\bar{R}(p) \quad (4)$$

Maximizing $\bar{R}$ in p will produce an optimal expected revenue $$R_{opt}=\max(\bar{R}(p))$$

and an optimal price to be charged for the product:

$$p_{opt}=\arg\max(\bar{R}(p))$$

The main purpose of the invented system is maximization of a preferred merchandising figure of merit like revenue, profit, etc. Mathematically, it is optimization of a selected objective function. For simplicity we will be considering maximization of revenue since other figures of merit may be dealt with quite similarly. If, say, maximization of gross profit G is desired, we have first to know the functions that express gross profits as a function of price and demand for each product: G=G(p,y) (similar to R in formula (1)). Then we can substitute the demand functions in (2) into those functions and perform optimizations as before for revenue in (3)-(4). Of course, numerical results, i.e. the optimal prices may be different. We consider the cases: single product vs. product group, regular price vs. clearance price, and simple period vs. composite period.

Pricing Optimization

Figure 2:
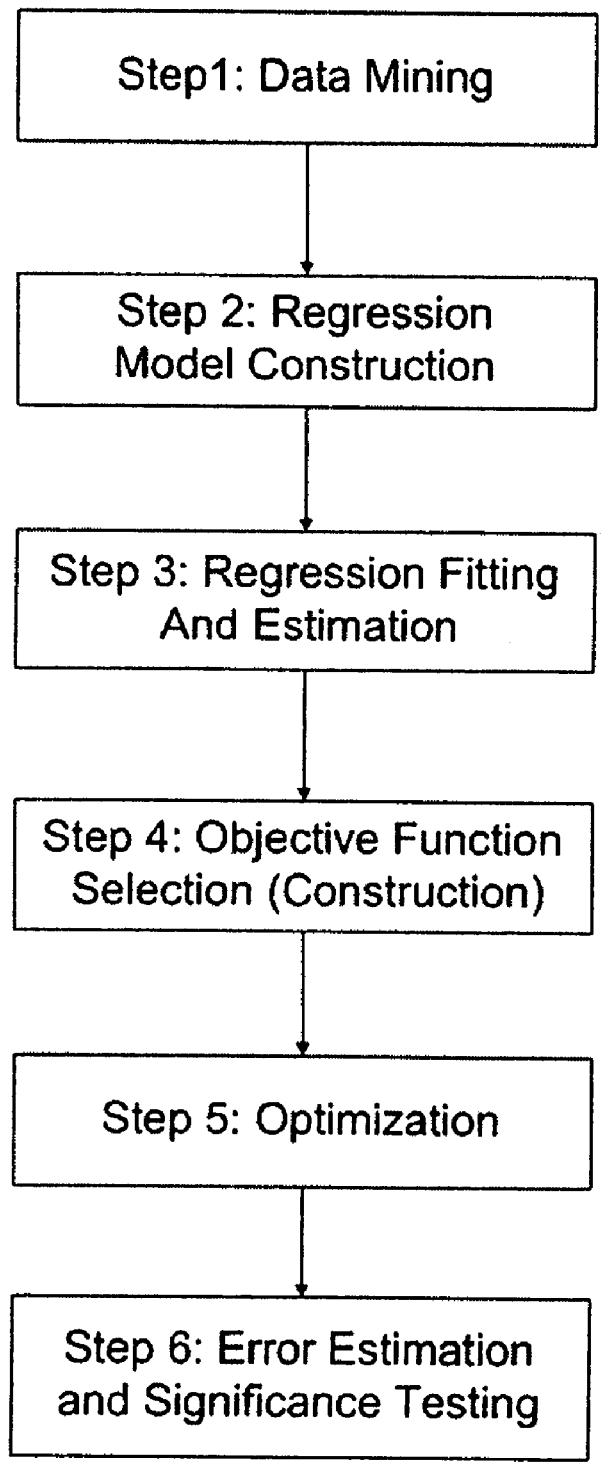
FIG. 2: Joint Pricing and Promotion System: Major Computational Steps

FIG. 2 presents six major steps of the "pricing component" in the statistical-optimization system:

Step 1: Data Mining

Step 2: Regression Model Construction

Step 3: Regression Fitting and Estimation

Step 4: Objective Function Selection (Construction)

Step 5: Optimization

Step 6: Error Estimation and Significance Testing

We will briefly review these steps using the single product example above. We will start with Step 2 postponing discussion of the preliminary Step 1. For constructing a useful regression model, we need to set up a regression design matrix (X matrix), a response vector (Y column), and a noise covariance matrix. The X matrix represents the sales conditions, or business influences, the Y column provides the weekly demands, i.e. sales volumes, and the noise covariance matrix reflects demand uncertainty.

The rows of the design matrix represent weekly sales conditions. To capture effects of those sales conditions, a number of regressor variables, or factors, representing them will appear as matrix's columns. Only relevant factors qualify for inclusion, i.e. the factors that could help in predicting the response and whose values can be uniquely determined for each week. Moreover, each of those factors has to have been observed on a number of different levels.

It is well known in econometrics that log-demand (logarithm of demand) should be used as the regression response, rather than demand: it describes demand better, helps to avoid a problem of negative demand values, and results in better properties of estimates. Therefore, we will be using the following regression model:

$$\log Y = X\beta + \pi p + \epsilon$$

Here X is the matrix of the variables $X_1, X_2, \ldots X_k$ representing concurrent sales conditions that could affect sales volumes like season, day of the week, holidays, product brands, various discounts, promotion activities measured on some scale, etc. Some of those sales conditions may be qualitative, i.e. e. categorical, while others quantitative. A particularly important variable is product's price p. The noise covariance matrix is assumed to have the structure $$cov(\epsilon) = \sigma^2 diag(1/w_1, \ldots, 1/w_n) \quad (5)$$

where the weights $w_i$ are presumed to have been estimated prior to fitting the regression.

At Step 3, the regression model is fitted by a WLS procedure, and we obtain a linear predictor for the log-demand in the form $$\log \hat{y} = x^T \hat{\beta} + p \hat{\pi}$$

At Step 4, an appropriate objective function is selected based on particular circumstances and on user's preferences communicated to the system via user's interface. Possible forms of objective functions are described in section Objective Function Construction below.

Proceeding to Step 5, we assume that the values of sales conditions for the target period are known or have been estimated. Then as seen from equation (4), the product's predicted mean revenue can be expressed as a function of price alone, and after performing optimization we obtain optimal values for revenue and price.

After optimal revenue and optimal price have been computed, error estimation and criticism of results (significance testing) are performed at Step 6. Since all obtained results are based on historical data, they are uncertain. Therefore, they have to be tested for significance, to make sure that the proposed price adjustments are not resulting exclusively from noise in data. The corresponding error estimation and hypothesis testing are described in section Pricing Optimization below.

Returning to Step 1, the data mining procedures scan the database for records on sales and on various attributes that may be used for representing sales conditions. They select data items from the records and arrange them in batches by weekly (or other) periods. While performing these tasks, data mining procedures use predefined patterns for constructing relevant factors to be included into regression model. These factors will be constructed by special procedures by converting attributes and measurements available in the database. Selection of relevant, i.e. available and useful, regressors depends on the target period on which the factors are going to be available, and on availability of those factors in the historical records.

There are a number of ways in which attributes available as field values in the database can be used in model construction. First, some attributes may be directly included as values of regressors into the design matrix. Second, dates in the database records linked to a calendar will enable to construct additional regressors such as day of the week, season, pre-holiday, etc. Third, some decisions on regression variables may be made based on the information available on the sales conditions during the target period. Finally, some additional data preprocessing, structuring, aggregating and condensing of data may also be performed at this stage.

Regular Pricing

Besides clearance price optimization, we have a problem of regular price optimization. Some of the differences as compared to clearance price are abundant inventory, and undetermined (unlimited) target period. Though no explicit target period is defined in clearance price optimization, we have to have a target period for the purposes of structuring historical sales data to be included into similar batches. Since sales activities are evolving around business week cycle, it is natural to define target period as one regular week. Regular week means a full business week with no holidays, pre-holidays, post-holidays, or any other features that might significantly influence sales activities. The part played by the target period in regular price optimization is limited: essentially, it is no more than a framework for extracting relevant data from the database.

Category Pricing Optimization

In reality, products come in categories rather than in isolation: an oat meal belongs into category cereal, cheddar belongs to category cheese (to a subcategory fat cheese), etc. Products in a common category tend to exhibit substitute demand, so that changes in sales of one product may directly affect sales of other products in its category. On the other hand, inter-category substitution is relatively low. As a result, it would be highly unrealistic to try to maximize revenue by adjusting prices of isolated products as described above. If the price of one product in a category is reduced, and as a result its sales and the corresponding revenue increase, it will probably also imply that sales of substitute products will go down which will make the category total revenue unpredictable. A similar but somehow inverse effect takes place for products with complementary demand, for example, gin and tonic, or alcohol and snack food. To correct for these effects, it appears necessary to consider revenue optimization of groups of substitute or complement products rather than single products. In so doing, we will be taking into account the effects of price adjustments of each product on the group as a whole, i.e. the changes in demand for all products in the group resulting from pricing changes in one or more products. The subsequent revenue optimization will also be done over all products in the group. The product category or a subcategory of manageable size appears a natural candidate for a group.

Earlier we mentioned two kinds of factors that could affect product demands: factors outside of our control like days of the week, and those like prices that are completely controlled by us and directly affect sales. However, there are additional factors like in-store promotional activities that are also controlled by us and can affect sales, though perhaps less directly and to a lesser degree than pricing adjustments. Now we will sketch a second model that will allow us to bring in a formal representation of promotion influences and to optimize them by optimizing in-store promotion scheduling. For the time being, we are leaving out the pricing optimization and are concentrating on promotion activities.

Promotion Scheduling Optimization

Assume that it is decided to promote a number of product items in a supermarket by running relevant commercial clips on a number of TV monitors stationed in various isles. At any given time period a TV monitor can carry a certain amount of clip demonstrations on a selected group of items, probably more than one demonstration of the same clip. Assuming that in general clip presentations tend to increase sales (though obviously to a limited degree), it is desired to develop clip presentation schedules for a set of in-store monitors that optimize promotion influence and thereby maximize overall revenue from sales of the promoted products.

Let the products that are going to be promoted be numbered d=1, 2, . . . , D. Then if in a given time period, a quantity $y_d$ of product d is sold at a price $p_d$ (price can be replaced by profit margin if desired), he overall revenue from sales of all products in the group is $$R = \sum_{d=1}^{D} p_d y_d \qquad (6)$$

In order to be able to maximize the revenue by optimizing promotion scheduling, we have to model influence of promotion schedules on product demands. This will be done by setting-up the following regression model.

Let $X=X_{dj}$ be the scheduling matrix giving the time devoted to promoting product d within a given time period on a monitor j, j=1, . . . , J, $y_{dj}$ be the sales volume of product d that resulted from its promoting on monitor j, and $f_{dj}(\bullet)$ the corresponding influence function:

$$y_{dj}=f_{dj}(X_{dj}) \qquad (7)$$

Since the cumulative sales of product d that resulted from all demonstrations on all monitors can be expressed as $$y_d = \sum_{j=1}^{J} y_{dj} \qquad (8)$$

we can substitute (7) and (8) into (6) and get $$R = \sum_{d=1}^{D} c_d \sum_{j=1}^{J} f_{dj}(X_{dj})$$

The influence functions $f_{dj}(\bullet)$ can be estimated by locally weighted regression methods, and then by going from random revenue in (6) to expected mean revenue $\overline{R}$, we write it as function of the scheduling matrix X:

$$\overline{R}=\overline{R}(X) \qquad (9)$$

Optimization of mean revenue in (9) can be carried out by mathematical programming techniques under appropriate restrictions like nonnegativity of demonstration times, physical restrictions on demonstration times on each monitor, etc. An obtained optimal solution $X_{dj}$ for all d and j will give us an approximation to the "true" optimal schedule.

Now we will outline a more comprehensive model that will allow to bring both pricing and promotion optimization systems into a common framework, and will enable to combine the beneficial effects of both.

Joint Pricing-Promotion Model

A generalization of the two models above is a comprehensive joint multivariate regression model having the formal structure $$U=G\Gamma+XB+P\Pi+E \qquad (10)$$

where U is the vector of log-demands for a given category of products, G is the common factors design matrix (containing the common sales conditions), $\Gamma$ is the common factors regression coefficient matrix (or common effects matrix), X is the individual factors design matrix (containing promotion effects), B is the individual factors regression coefficient matrix (individual effects matrix), P is the price design matrix (matrix of own and cross price effects) whose rows are category price vectors at past periods, $\Pi$ is the price regression coefficient matrix, E is the noise matrix. For optimization of pricing as well as of promotion scheduling we need to construct predictions of demand by fitting equations (10). It will be done in a stepwise manner in a real time loop, say, daily, using the historical sales data up to the current day. It will be assumed that at the very start, there are available sales data for some previous period, say, one year. The sales data contain the sales conditions data that fill the matrices G, X and P, as well as sale quantities U. After a latest fit of the equations (10), we obtain estimates of $\Gamma$, B and $\Pi$, and can construct a linear predictor for the category log-demand vector u in the form $$u=g\hat{\Gamma}+x\hat{B}+p\hat{\Pi} \qquad (11)$$

where the vectors g, x and p provide common sales conditions, promotion conditions and category prices respectively for a target period for which prediction is being sought. From (11) we can express the category demand vector y as a function of promotion schedules x and price vector p:

$$y=f(x,p)$$

Now we can optimize category revenue in (6) in x and p under appropriate restrictions and obtain optimal promotion schedules and prices for the target period.

Pricing and promotion estimation-optimization steps can be performed consecutively rather than simultaneously which means that at pricing step the promotion-related quantities are presumed known and do not change; conversely, at promotion step all price-related quantities are considered constant. Technically, at the pricing step, the fitted equations are $$V = G\Gamma + P\Pi \quad (12)$$

with $$V = U - X\hat{B} \quad (13)$$

where $\hat{B}$ have already been estimated and therefore are assumed known. At promotion step, the fitted equations are $$Z = X\beta. \quad (14)$$

with $$Z = U - G\hat{\Gamma} - P\hat{\Pi} \quad (15)$$

where $\hat{\Gamma}$ and $\hat{\Pi}$ have already been estimated.

Figure 3:
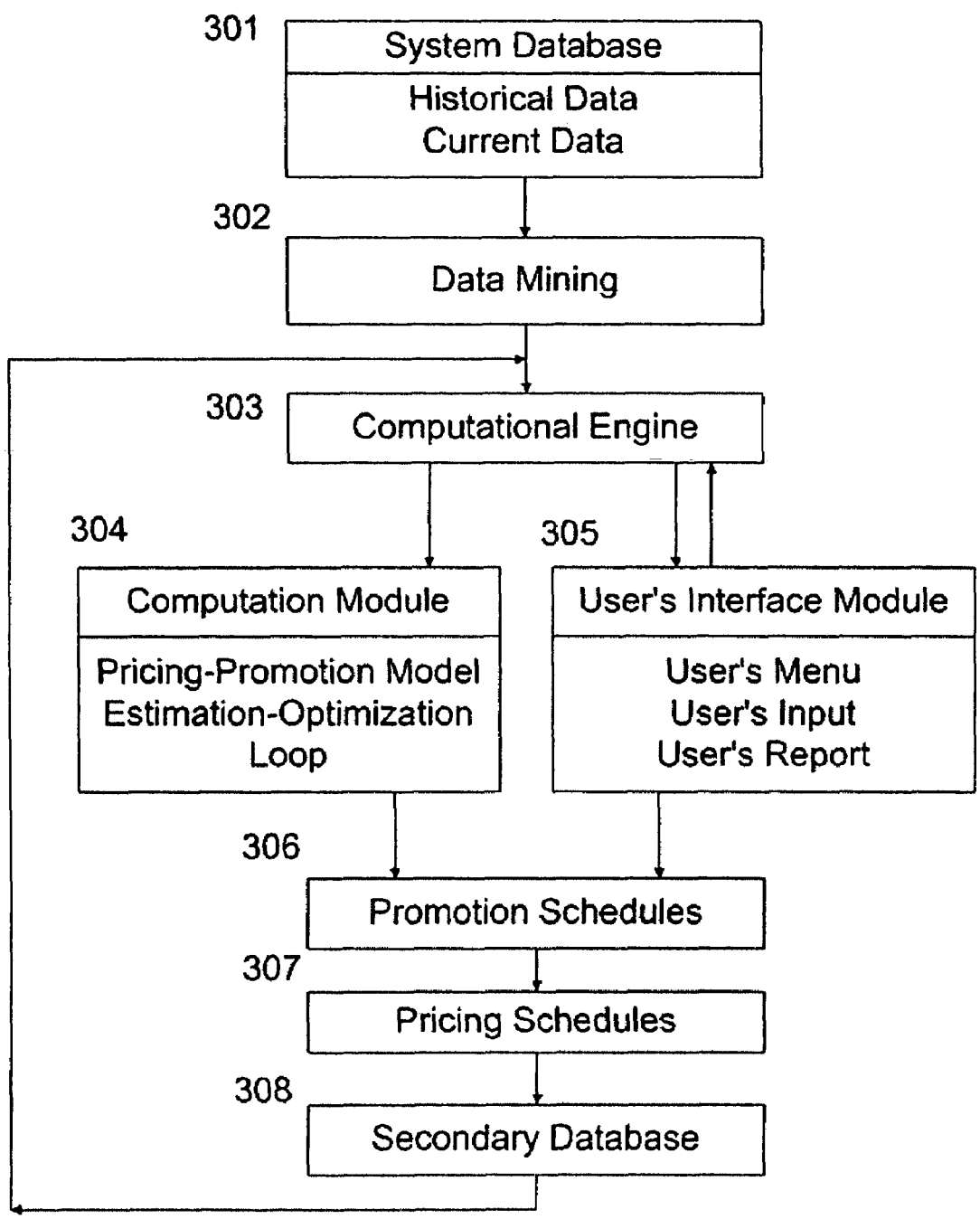
FIG. 3: Joint Pricing and Promotion System: Major Components

This approach is shown schematically in the flow-chart in FIG. 3 and described in detail in section Pricing-Promotion Estimation-Optimization Loop below. Block 301 shows the system database containing historical data and current (latest) data. The data obtained from data mining in Block 302 is fed into the computational engine in Block 303. The computational engine receives instructions and parameters from the user in Block 305 and provides (modified) instructions and parameters for the computational module in Block 304 containing the main system model and the computational loop. It produces promotion schedules (Block 306), pricing schedules (Block 307), and a new batch of data for the secondary database in Block 308. After the loop is completed, control returns to the computational engine in Block 303.

This approach is preferred for the following reasons:

1. It can be assumed that at the very start, there are available sales data for some previous period, say, one or two years. On the other hand, it is not assumed that data on promotional activities have been stored in the database. So, while equations (12)-(13) can be fitted, equations (14)-(15) cannot, at least, for the time being. Therefore, it appears natural to introduce an initial period during which prices could be estimated and optimized while promotion schedules would be generated by an Initial Promotion Scheduling Procedure.

2. Different types of regression may be used for estimation in pricing and in promotion scheduling: linear for log-demand in pricing, and locally weighted in scheduling. Either of them can be modified or extended in various ways if desired without affecting the structure of the other.

3. Time periods and the corresponding matrix rows have natural ordering in pricing optimization. There is always one current price and any price changes can be only affected relative to it. In contrast, the time ordering of a sequence of promotion schedules does not seem to carry much weight. Neither does the current schedule. Next schedule construction may start from any recorded schedule, and as a result attempts at schedule optimization may cause large jumps in the scheduling space.

4. Effects of price changes on sales appear to be much stronger and more unambiguous than those of promotion displays. Therefore, it seems necessary to provide safeguards against spurious effects of promotion scheduling. For preventing false moves in the schedule space, we introduced two modifications: First, more promising existing schedules are selected as candidates for starting points in construction of the next schedule, and second, statistical hypothesis testing is done for checking significance of an expected revenue increase. If significant, the corresponding promotion schedule as computed by the optimization leg is suggested as the next schedule; otherwise, a new schedule in the vicinity of the existing schedules is constructed with the sole purpose of increasing the density of the data points in the exploration region and giving a better chance of obtaining significant revenue increase at a later period.

Contents of Database

The use of historical sales records stored in a database is crucial for constructing a regression model, with subsequent estimation of parameters, and calculating expected revenues, expected demands, and other quantities of interest. It is presumed that the available historical data contain at least scanner data and probably some extra data. Scanner data are electronic records of transactions that are collected as part of business operation. The most familiar and now ubiquitous form of scanner data is the scanning of bar codes at checkout lines of retail stores.

Figure 4:
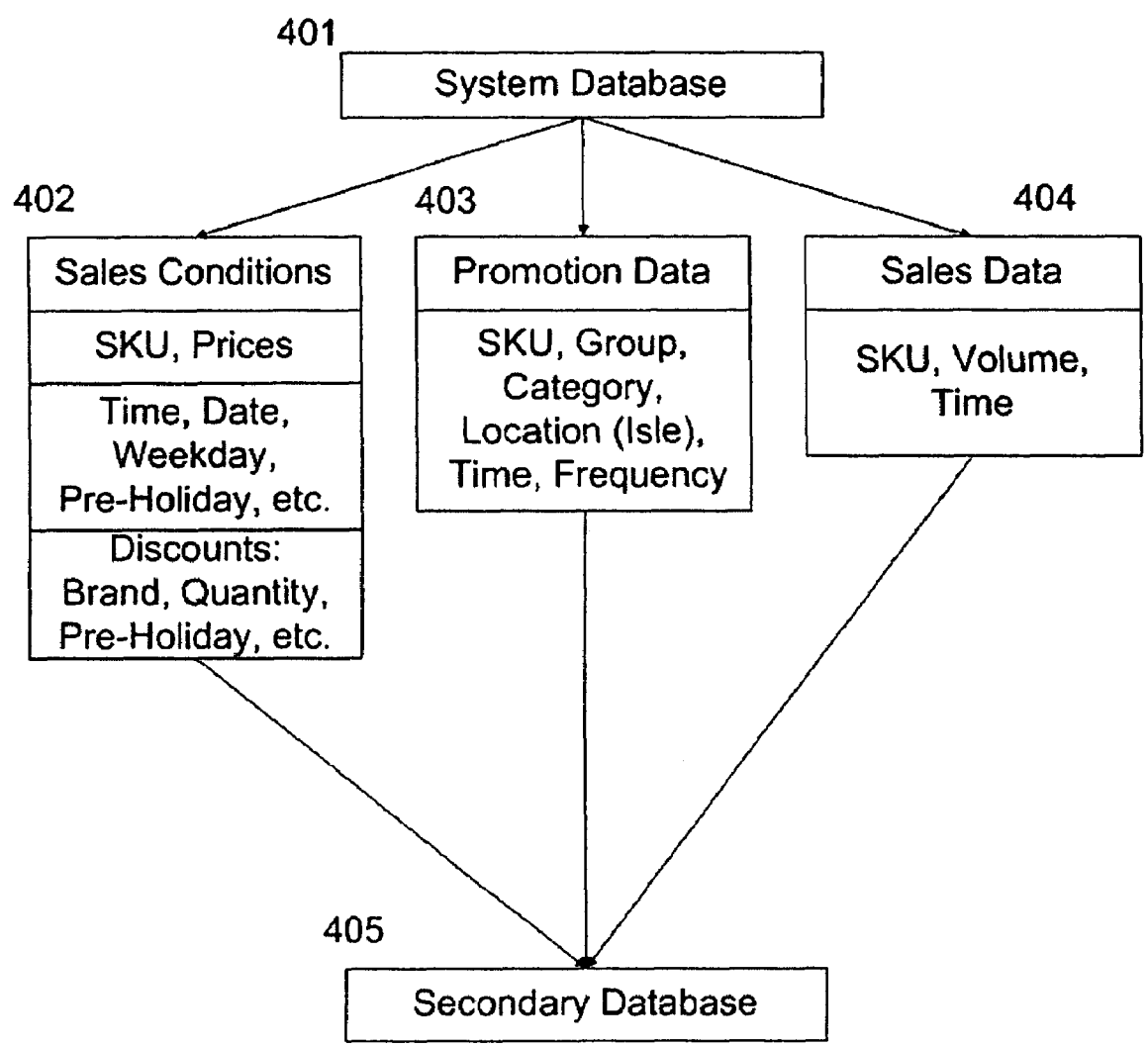
FIG. 4: System Database

The historical data are stored in a file in some standard format and consist of sales records organized by dates and containing a number of attributes. Alternatively, they may be stored in a set of files in different formats, but then the control system should be able to query those files simultaneously, to merge records, etc. We consider first the case of a single product item, and later a group of items. We can visualize (FIG. 4) the system database (Block 401) as a table containing the following groups of attributes: Sales conditions (Block 402), promotion data (Block 403), and sales data (Block 404). Sales conditions contain such relevant attributes as SKUs, prices, time, day, weekday type, product brands, discounts: brand, quantity, package, pre-holiday discounts, etc. (SKU is Stock Keeping Unit, i.e. a number associated with a product for inventory purposes or, alternatively, relating the product to any arbitrary numbering system capable of uniquely identifying it.) Promotion (advertising) data include SKU, product group, product category, TV screen location, time of day, and frequency of clip demonstrations. Sales data include SKU, sales volume, and time of day. The secondary database containing the required data in a convenient form is shown in Block 405.

Structure of Regression Models, and Data Mining

Historical data on sales stored in a database is used for constructing regression models. There are two major components to regression models: relevant factors, or regressors, and data batches that define rows of regression matrices. Both these components are constructed by data mining procedures that extract data from databases and arrange them into predefined patterns using statistical and logical criteria and also built-in expert knowledge.

A regression design matrix is constructed based on the records in the table, i.e. database, and on any relevant additional info available. First, some of the above attributes may be included as values of regressors into the design matrix. Second, dates in the table linked to a calendar will enable us to construct additional regressors such as day of the week, season, pre-holiday, etc. Third, some decisions on variables are based on the information available on the sales conditions during the target period, i.e. the period for which the prediction and planning are going to be made.

Assume that pricing optimization has been planned for one week. This means that a target period has been set at one-week period and therefore all expected quantities of interest have to be calculated for one week ahead. Then the historical data will be broken into weekly periods, and weekly data batches will be used in regression models. The response column will be logarithms of cumulative weekly sales.

For constructing the design matrix, it should be decided what regressors (or variables, or factors) it should contain. Selection of relevant, i.e. available and useful, regressors depends on availability of those factors both in the historical data and in the target period. Regression factors may be classified into the following groups: general factors like day of the week, or pre-holiday day, prices, promotion activities quantified as necessary, and other factors like product brand, quantity discounts, etc. Promotion activities in our sense are clip demonstrations on in-store monitors and do not include any other forms of promotion, so that quantity discounts and other factors which might be viewed as promotion are grouped separately.

Some of the regressors are quantitative, others qualitative (or categorical), and some may be both. Besides obviously quantitative variables like price, the regression model will contain additional variables for representing influences originating from package discounts, special pre-holiday discounts, advertising activities, differences between days of the week, seasonal influences, etc. Price is among the most important quantitative regressors. Days of the week, seasons, pre-holidays, package discounts are qualitative and thus representable by categorical variables. Quantity discounts can be quantitative, qualitative, or both. Promotional activities, their structure, characteristics, localization and intensity may be modeled by a combination of categorical and quantitative variables.

Relevant Factors

A factor is called relevant if
1. It is available in the historical database;
2. It is available within the target period;
3. Its value is known by the beginning of the target period and does not change during it.

In our one-week example, we can include season and pre-holidays among relevant factors and also factors like product brands, quantity discounts, package discounts, special pre-holiday discounts, advertising activities if the values of those factors are going to be fixed during the target period. Then the regression design matrix will have rows corresponding to past weeks, and the following regressors: Season, holiday, quantity discounts, package discounts, pre-holiday discounts, advertising, and price.

Besides regressors that are always used in the regression, there may be others whose presence is determined by various circumstances such as measurement availability, ease of computation, or user's assumptions, for example, regressors that model time explicitly. Such regressors are added at the model construction step.

Time influence can be modeled in a number of ways. Under assumption that there is no discernible time trend, i.e. sales volumes and conditions do not change much within the overall time period, no direct modeling of time appears necessary. On the other hand, if time trend is known to exist or is suspected, time may be modeled as a discrete quantitative variable numbering, say, weeks, or any other preferred time periods. Treating sales histories showing seasonal influences will require introducing polynomials in time into the regression. Alternatively, rather than introduce time factor explicitly, it is possible to use generalized, or weighted, least squares for estimation where smaller weights are given to older records.

Similar Time Periods, Similar Batches, Admissible Batches

Similar time periods will be defined by their similarity to the target sales period, and will have duration of that period. Sales activities like many other business activities are evolving around weekly business cycle. This basic weekly cycle is modified by other factors like holidays, seasonal influences, etc. Sometimes, however, one may be better off by defining similarity for shorter periods like, say, separate days of week, or even parts of the workday. On the other hand, while handling the data on Christmas sales, say, one may want to have similarity defined by a modulo one year. In general, definition of similarity for time periods should be based on a priori information, expert knowledge of subject matter, and also on relevant statistical considerations.

Subsets of sales records associated with a given time period are called batches. 'Associated' here means that the corresponding sales took place within time boundaries of the given period. The batches associated with a set of similar periods are called similar batches.

Before estimating a model it is desirable to check if the quantity and quality of the available data are satisfactory, otherwise, the model cannot be used for prediction. A set of data batches is admissible, if they provide sufficiently good data for estimation and prediction. The corresponding verification will be done by an Algorithm for Batch Set Admissibility and Regressor Relevancy described below.

Simple Target Periods Versus Composite Target Periods

Sometimes breaking down historical data into time periods similar to the target period is not feasible or is not beneficial from the statistical point of view. In such cases we will conceive of a given target period as a composite period consisting of a number of subperiods.

Consider an example. The selected target period is one week and we have historical data on 10 weeks but the prices used to be changed in the middle of the week, say, on Wednesday morning. Then operating in terms of the one week time period we cannot use the historical data at all since no price value can be attached to any past single week period.

These difficulties arise because the requirement to be always able to break down historical data to periods similar to the target period is too rigid. Therefore, it would be beneficial to conceive of the target period as consisting of, say, three one-day periods. Then we could use all the data available on Mondays for estimating 'Monday parameters', and all the data available on Tuesdays, Wednesdays and Thursdays for estimating 'regular day parameters'. Thus, the composite target period approach first partitions the target period, then performs data mining and regression modeling and estimation separately for those subperiods, and then constructs the overall revenue function for the whole target period and maximize it.

Modeling of Promotional Activities

Assume that product items are promoted by running commercial clips on a number of TV monitors stationed in various isles. At any given time period a TV monitor can carry a certain amount of clip demonstrations on a selected group of items, usually more than one demonstration of the same clip. The time dedicated to promotion of a given product at a particular monitor within a given time period could be used as a quantitative regression variable. For a group of monitors, this would produce a multiple regression model with locally weighted regressions as influence functions.

Since influence functions in promotion scheduling may be non-stationary, e.g. vary considerably from hour to hour and possibly among days of the week within the same hours, it may be helpful to structure the time grid for clip demonstrations accordingly. Thus, we can view the week as a recurrent time frame consisting of a fixed series of different days of the week or daytypes. Furthermore, we may partition a working day into, say, four supposedly homogeneous time blocks: from the opening hour to 9 a.m., from 9 a.m. to 4 p.m., from 4 p.m. to 7 p.m., and from 7 p.m. to the closing. Then promotion influence functions can be assumed stationary inside each time block.

Setting-Up Secondary Database

Mining the whole available historical database is a time-consuming and expensive process. After initial data mining of the historical master database, it may be advantageous to set-up a secondary working database that contains only the data necessary for estimation-optimization computations. Such data will be stored in the form most suitable for reading and processing, and moreover, the newly obtained current data will be immediately converted into this form obviating the need to extract them from the master database.

Pricing Regression Modeling

Optimization of revenue requires construction and fitting of regression models, estimation of all relevant parameters and making predictions based on them. Here we consider construction and fitting of those parts of joint regression models that relate demand to prices. For specifying a regression model, one needs to provide a form for regression function, regression data batches (corresponding to rows of regression matrix), regression factors (corresponding to columns of regression matrix), and assumptions on covariance matrix (noise structure). For any product on sale, the form of regression function is given by a price-demand function known up to parameter values. We consider regression modeling of individual products first, and then the changes needed for modeling a group of interrelated products.

Regression Model Construction for Individual Products

As explained previously, the regression model contains rows $(x_i, u_i, w_i)$, $i=1, \ldots, n$, corresponding to all similar batches (with log-demands $u_i = \log(y_i)$) where $x_i$ describes sales conditions, $y_i$ sales volumes, and $w_i$ the weights associated with corresponding periods. For a similar batch containing k records with sales volumes $$y_1, y_2, \ldots, y_k \quad (16)$$

its sale volume is the sum of the sales volumes in all k records in (16):

$$y = \sum_{j=1}^{k} y_j$$

Figure 5:
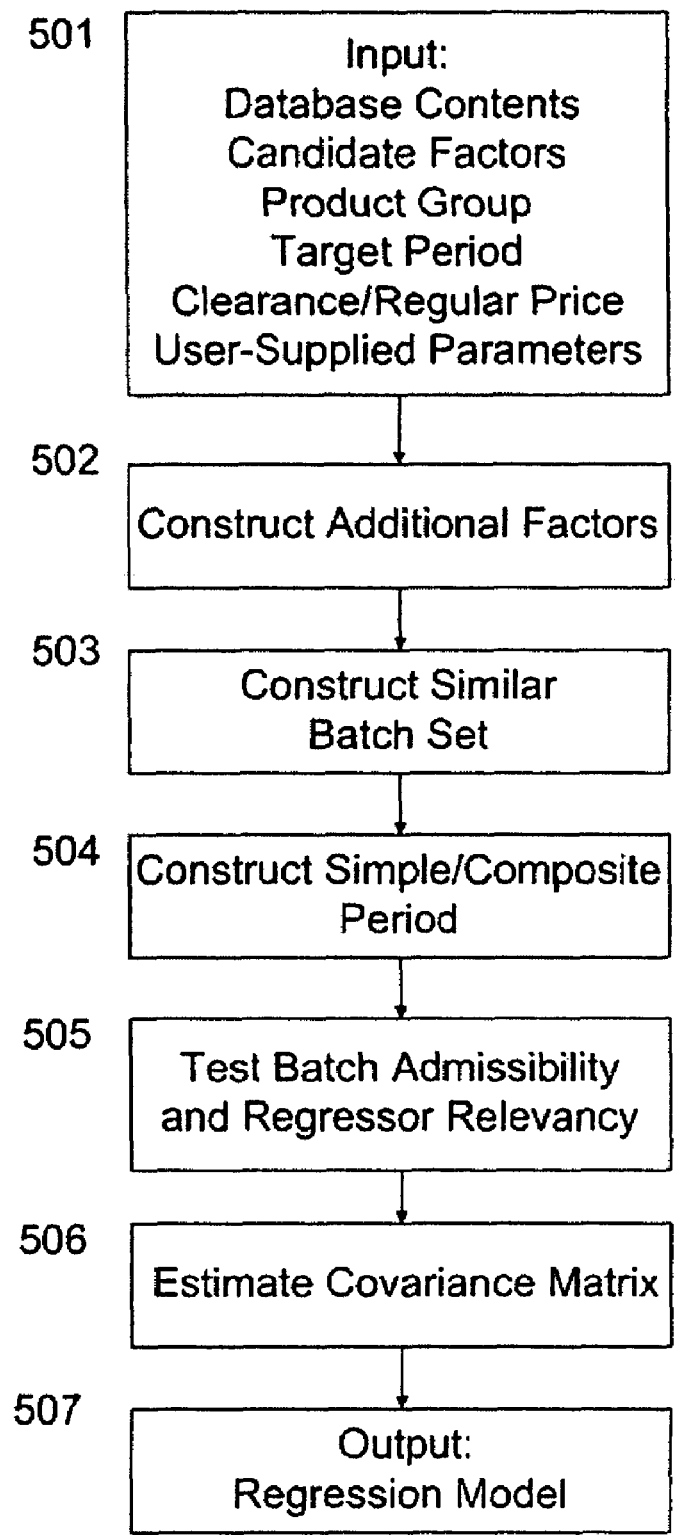
FIG. 5: Pricing: Regression Model Construction

Regression model construction is shown in FIG. 5. Input to the procedure contains a list of data items, parameters, default values, and user-selected items of which major ones are shown in Block 501. Based on this input information and built-in procedures, additional regression factors are constructed in Block 502. A set of similar batches is constructed from contents of the database based on selected parameters, and user-supplied items and instructions in Block 503. Decision to proceed with simple period or composite period is made in Block 504, batch set admissibility and regressor relevance are tested in Block 505, and finally the noise covariance matrix is estimated in Block 506. An output of the procedure that is the constructed regression model is shown in Block 507.

Figure 6:
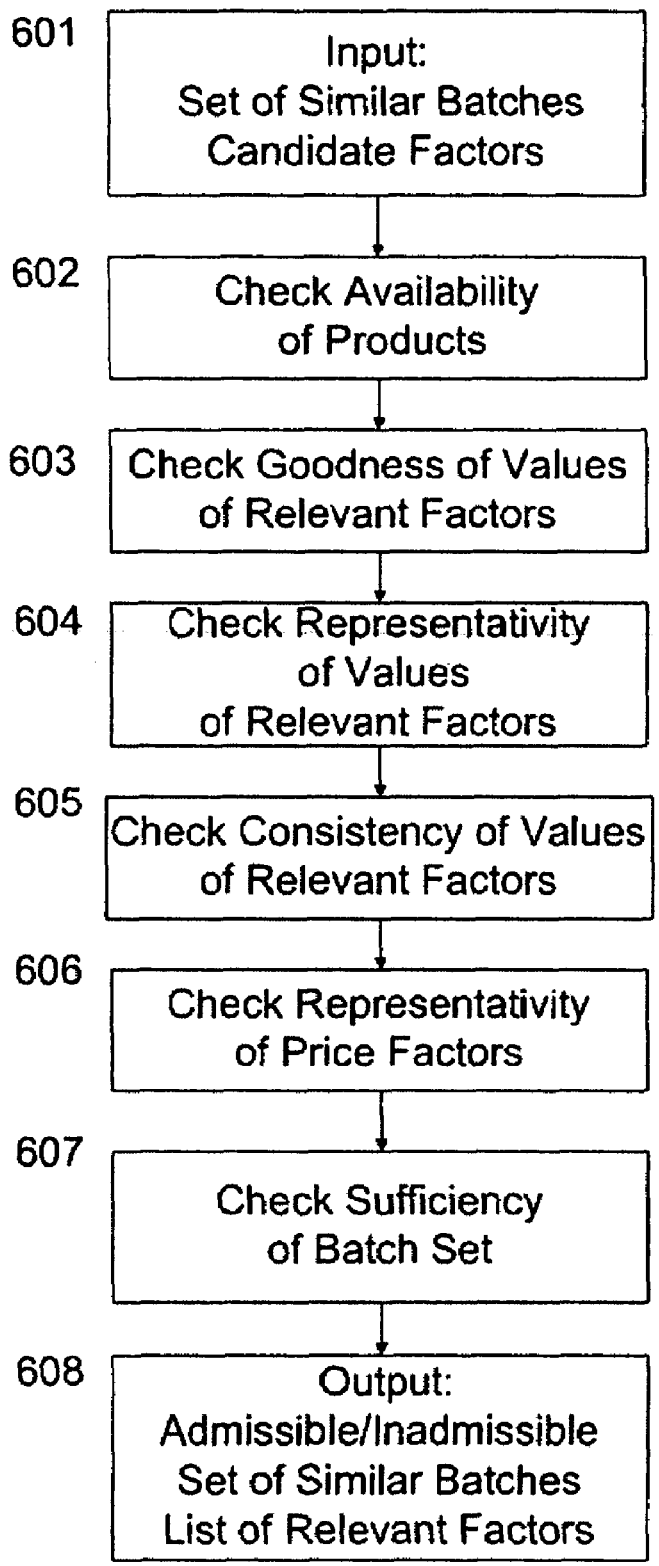
FIG. 6: Pricing: Testing for Batch Set Admissibility and Regressor Relevancy

Testing for Batch Set Admissibility and Regressor Relevancy indicated in Block 505 is shown in FIG. 6:

1. Input: Set of similar batches, List of candidate relevant factors;
2. For all batches, check if the product was available for sale during the corresponding period; if yes, mark that batch as 'admissible'; if not, as 'inadmissible';
3. Check if all the selected relevant factors are defined and have good values for all records in the similar batches. If some relevant factors are undefined, missing, have outlying values, etc. for some records, label them accordingly and apply methods for dealing with those problems in the X matrix if the problems are not too severe; if they are, discard corresponding records or the factors themselves;
4. Check if each relevant factor has at least two measured levels among the similar batches; if not, label it 'irrelevant' and discard it;
5. Check if no selected relevant factor has two or more different values in a single batch; if it happens, exit with a corresponding error message;
6. If the price factor does not have at least two levels, declare the batch inadmissible;
7. Check if there are enough batches for fitting regression. A simple formula may be adopted for defining the minimal number of batches, say, 2k+3, where k is the number of regression parameters to be estimated. So, if n<2k+3, declare the batch set inadmissible;
8. Output: Logical output: admissible/inadmissible batch set, Error message describing reasons for inadmissibility, Set of similar batches (may be a subset of the initial set on the Input), List of relevant factors (may be a subset of the initial list on the Input).

Estimation of the Covariance Matrix

Our problem does not support the assumption of homoscedasticity of variance since if days of the week are represented by regression indicators, then different sales volumes in, say, Mondays and regular days will influence the corresponding variances. On the other hand, if separate regressions are fitted for various daytypes, widely different sales volumes resulting, for instance, from a heavy promotion campaign may invalidate homoscedasticity assumption. Therefore, we will be assuming the covariance matrix structure in formula (5) where the weights are presumed to have been estimated prior to fitting the regression from formula $$w \sim 1/(\text{coeff\_var})^2 \quad (17)$$

where $$(\text{coeff\_var})^2 = var(u)/(\text{mean}(u))^2 \quad (18)$$

Now we have to estimate $\text{mean}(u) = \text{mean}(\log(y))$ and $var(u) = var(\log(y))$. Assuming that single sales volumes are randomly identically distributed with mean $\mu_1$ and variance $\delta_1^2$, a batch sales volume is normally distributed as $y \sim N(\mu, \delta^2)$ by the Central Limit Theorem with parameters $$\mu = k\mu_1 \text{ and } \delta^2 = k\delta_1^2 \quad (19)$$

We will use robust estimators for mean $\mu_1$ and variance $\delta_1^2$ of the form $$\hat{\mu}_1 = med(y_1, \ldots, y_k) \quad (20)$$

and $$\hat{\delta}_1 = (med(|y_j - \hat{\mu}_1|))/\Phi^{-1}(0.75) \quad (21)$$

where med is median, and $\Phi^{-1}$ is the inverse of the standard normal distribution function.

Algorithm for Estimation of Variance Weights:
1. Compute estimates for $\mu_1$ and $\delta_1^2$ by robust formulas (20) and (21);
2. Compute estimates for $\mu$ and $\delta^2$ by formulas (19);
3. Compute mean(u) and var(u) by a numerical integration routine;
4. Compute weights w by formulas (17)-(18).

Regression Model Construction for Groups of Interrelated Products

As indicated above, products come in categories with substitute and complementary demand, and an efficient modeling has to take it into account. Therefore, we will consider revenue optimization of groups of substitute or complement products rather than single products. In so doing, we will be taking into account the effects of price adjustments of each product on the group as a whole, i.e. the changes in demand for all products in the group resulting from pricing changes in one or more products. It is implemented by regressing the demand of each product on the category price vector and then optimizing the category total revenue. Of course, the number of regressors in the regression model increases, and optimization must be performed in a multidimensional space of category price vectors. Thus, category pricing modeling and optimization are much more difficult than single product pricing optimization.

Using the properties of the least squares we can rewrite the multivariate regression model (10) as a system of D univariate regression models each corresponding to a single item d, for $d=1, \ldots, D$ $$U_d = G\gamma_d + X_d\beta_d + P\pi_d + \epsilon_d \quad (22)$$

where P is an n×D matrix modeling the effects of a product's own price as well as the category's cross-prices the rows of which have the form $$1/(1+p_1) \ldots 1/(1+p_{d-1}) p_d 1/(1+p_{d+1}) \ldots 1/(1+p_D)$$

and $\pi_d$ is the corresponding D×1 vector of regression price coefficients.

Regression Fitting and Estimation

The constructed regression models for all products in the selected group are fitted by restricted weighted least squares. 'Restricted' since the price sensitivity should be always positive, and 'weighted' as the covariance matrix of noise is not scalar. Although the least squares procedure is not robust to outliers, the resulting overall procedure is robust due to robust batch estimators in formulas (20) and (21).

For computing a predicted revenue function for the target period, we have to estimate the variance $\sigma_T^2$ for that period, which is equivalent to estimating an unknown variance weight $w_T$ at a "new" point. This in itself is a prediction problem and can be solved by one of standard methods, such as the nearest neighbors method.

Regression Variable Selection via Cross Model Validation (CMV)

The meaning of the common price design matrix is that the sales of any item in its category may be affected by all cross-prices in that category. These intracategory relationships enter via explicit dependency of each item's sales on the category price vector rather than on its own price alone. Though a priori the category price matrix will contain all cross-prices, it may happen that in fact only a small subset of prices really influences a given product's sale, the remaining category prices being superfluous. Those extra regressors will inflate predictor variances thereby causing deterioration in statistical properties of an estimated model and as a consequence in the properties of an optimized solution. To deal with this problem we apply a Cross Model Validation approach to variable selection described by Hjorth (1994). Variable selection will be applied in our model only to cross-prices, own price and other primary regression variables always staying in the model.

Assume that we have regressors $p=1, \ldots, P$, and an estimation set ES containing observations $1, \ldots, n$. We distinguish between regressor subsets S and models m. If we have an estimation procedure, e.g. OLS, or SVD (modified OLS), we obtain a model m from a regressor subset S by applying this estimation procedure to S. If a subset S has p regressors, we say that it has size p and write #S=p. Often while searching through all subsets of a given size we will have to enumerate them in some way: $S_1, \ldots, S_{N_p}$ where $N_p = \#\{S : \#S = p\}$ is the number of subsets of size p. Each model m produces prediction $\hat{y}$ for any data point x: $\hat{y} = m(x)$. We denote by $ES_j$ the data ES with deleted observation j. For any regressor subset S and any observation j we have a model $m(S,j)$ obtained by applying the estimation procedure to subset S on data $ES_j$. Applying this model to a data point $x_i$, we obtain prediction $\hat{y}_i(m(S,j))$. For any model $m(S,j)$ and data set $ES_j$, we define an Internal Quality Criterion, or a Quality Measure of the model:

$$IC(m(S, j), ES_j) = \sum_{i \neq j} (\hat{y}_i(m(S, j)) - y_i)^2$$

Algorithm for Variable Selection via Cross Model Validation
1. For all p and j, compute the best model $M(p, j)$ by criterion IC;
2. For each $p=1, \ldots, P$, compute the Cross Model Validation measure CMV(p) that accounts for the search for a best model for each size p:

$$CMV(p) = 1/n \sum_{j=1}^{n} (\hat{y}_i(M(p, j)) - y_i)^2$$

3. Calculate optimal model size $p_0$ by min CMV(p) over all sizes p;
4. Compute the final best model of size $p_0$.

Objective Function Construction

We consider the cases: single product vs. product group, regular price vs. clearance price, and simple period vs. composite period.

Single Product

Under the regular price optimization we have abundant inventory as opposed to scarce inventory under clearance price optimization, and undetermined (unlimited) target period.

Single Product—Regular Price—Simple Period

Predicted revenue is computed as $$R = p \exp(u_T + \sigma_T^2/2) \quad (23)$$

that follows from the expression for mean of log-normal distribution. All the quantities in (23) are known or presumed to have been estimated except the price vector p that will play the part of control variables. Predicted mean log-demand $u_T$ is estimated as $$u_T = g_T^T \hat{\gamma} + p\hat{\pi} \quad (24)$$

The values of factors in the common factors vector $g_T$ are known or have been estimated. Estimates $\hat{\gamma}$, $\hat{\pi}$ and $\hat{\sigma}^2$ have been obtained from regression fitting as described above. A variance estimate of log-demand for the target period (regular week) in formula (23) is computed as $$\sigma_T^2 = \hat{\sigma}^2 / w_T \quad (25)$$

where the weight $w_T$ is estimated as $$w_T = \left(\sum_{i=1}^{n} w_i\right) / n \quad (26)$$

Now the revenue optimization problem can be easily solved by maximizing the predicted revenue R in (23) in p under additional default or user-defined constraints on feasible prices. As a result, we will obtain the optimal revenue $R_{reg}$ and the optimal regular price $p_{reg}$. Local maximization is done as follows: First, a neighborhood of the current (or initial) price $p_{cur}$ is defined. This neighborhood should either be restricted by the range of historically recorded prices, or it should allow limited extrapolation, say, at most 25% outside of that range. Revenue maximization will be done over the neighborhood, or probably over its subset if there are additional a priori restrictions on prices. In other words, optimization of revenue will be done by searching for a local maximum of R reachable from $p_{cur}$. Predicted sales volume (demand) $V_{reg}$ for a regular week may be computed by formula $$V_{reg} = \exp(u_T + \sigma_T^2/2)$$

In this formula for $V_{reg}$, the mean log-demand $u_T$ is computed by formula (24) in which the optimal price $p_{reg}$ has been substituted for price p.

Single—Product—Regular Price—Composite Period

The predicted revenue for a composite period is computed by formula $$R = \sum_{i=1}^{k} R_i$$

where each revenue $R_i$ for a subperiod i is computed by formula (23)

$$R_i = p \exp(u_{iT} + \sigma_{iT}^2/2)$$

Similarly for predicted sales volumes (demands). Parameters $a_{iT}$ and $\sigma_{iT}^2$ are estimated for each component subperiod separately as described above for simple target period.

Single—Product—Clearance Price—Simple Period

Predicted revenue is computed by formula $$R = pI - (p-s)I\Phi(b_T + \sigma_T) + (p-s)\exp(u_T + \sigma_T^2/2)\Phi(b_T) \quad (27)$$

where $u_T$ is the predicted mean log-demand computed as in (24); $b_T = (\log I - u_T - \sigma_T^2)/\sigma_T$; $\sigma_T^2$ is the predicted (estimated) variance of log-demand for the target period computed as in (25); The weight $w_T$ has been estimated; I is the inventory level to be sold out during the target period provided on input; p is the clearance price to be optimized; s is the salvage price (0<s<p) provided on input; and $\Phi$ is the standard normal distribution function; values of common factors in the common factors vector $g_T$ are known or have been estimated; estimate $\hat{\pi}$ has been obtained from regression fit.

The revenue optimization problem is solved by maximizing the predicted revenue R in (27) in p under additional constraints on feasible prices resulting in the optimal revenue $R_{sale}$ and the optimal price $p_{sale}$. Predicted sales volume (demand) $V_{sale}$ may be computed by formula $$V_{sale} = I - I\Phi(b_T + \sigma_T) + \exp(u_T + \sigma_T^2)\Phi(b_T)$$

and the predicted leftover stock $I_{left}$ is computed by formula $$I_{left} = I - V_{sale} \text{ if } V_{sale} < I \text{ and } I_{left} = 0 \text{ otherwise}$$

Single—Product—Clearance Price—Composite Period

For each component subperiod i, the quantities $u_{iT}$, $\sigma_{iT}^2$, $w_{Ti}$ and the rest are computed exactly as in 'Single—Product—Clearance Price—Simple Period' case above. However, we have no analytical counterpart of the formula (27) for the predicted revenue. Therefore we use Monte Carlo for calculating the values of the predicted revenue on a grid of price values, and then perform optimization.

Multiple Products Group (Category) Optimization

Estimation and optimization for a group of products simultaneously are much more difficult than for a single product.

Multiple Products—Regular Price—Simple Period

The meaning of the common price design matrix is that the sales of each product depend on the category price vector rather than on its own price alone. The category total predicted revenue is computed by formula $$R = \sum_{d=1}^{D} R_d \quad (28)$$

where $$R_d = p_d \exp(u_{dT} + \sigma_{dT}^2/2) \text{ for } d = 1, \ldots, D \quad (29)$$

are individual product revenues. Here $p = (p_1, \ldots, p_d)^T$ is the category price vector. The quantities $u_{dT}$, $\gamma_d$, $\hat{\pi}_d$, $\sigma_{dT}^2$, $w_{dT}$ are computed for each item d exactly as above in formulas (24)-(26). On substituting them into (28)-(29), we obtain R as a function of the category price vector:

$$R = \sum_{d=1}^{D} p_d \exp(u_{dT} + \sigma_{dT}^2/2)$$

Multiple Products—Regular Price—Composite Period

The situation here is essentially a combination of 'Single—Product—Regular Price—Composite Period' case and 'Multiple Products—Regular Price—Simple Period' case.

Multiple Products—Clearance Price—Simple Period

We begin with the case when clearance sale is planned for a single particular product in a category. This problem is difficult because at the start of the clearance period, the clear-out product influences the sales of the regular products, but once a clear-out product has been sold out, the number of competing products is reduced immediately, which changes the demand equations for all remaining products in the category.

We consider a category of a size D containing products $$Z_1, Z_2, \ldots, Z_{D-1}, Y$$

of which the first D−1 are regular products while the last Y is a single clear-out product with known inventory I and clearance period T. Denote by y cumulative demand for product Y over the clearance period, and by $z_d$ cumulative demand of a regular product $Z_d$ over the same period. Denote also the demand for product $Z_d$ at day t by $z_{dt}(y)$ if product Y was on sale at day t, by $z_{dt}$ if product Y was not on sale at that day, and by $z_{dt}(y?)$ if product Y was sold out during that day. The demand y for the clear-out product Y depends on the category price vector $p=(p_1, \ldots, p_{D-1}, p_D)^T$. The demand $z_{dt}$ for a regular product $Z_d$ at day t depends on the category price vector p if Y was on sale at that day, and depends on the first D−1 prices if Y was not on sale at that day. Define the sums $S_1=y_1$, $S_2=y_1+y_2$, ..., $S_T=y_1+y_2+\ldots+y_T$, so that we have $0<S_1<S_2<\ldots<S_T$. Now define T+1 non-overlapping and exhaustive events: $e_1=\{I<S_1\}$ which says that product Y was sold during day 1; $e_2=\{S_1<I<S_2\}$ which says that product Y was on sale for the whole day 1, and was sold out during day 2; $e_{T+1}=\{S_T<I\}$ which says that product Y was not sold out over the clearance period. Denoting by r(Y) and $r(Z_d)$, d=1, ..., D−1, the revenues from products Y and $Z_d$ respectively during the clearance period, by r the category revenue, and by R the expected category revenue, we can write $$R=Er=E(r|e_1)Pr(e_1)+\ldots+E(r|e_{T+1})Pr(e_{T+1}) \quad (30)$$

where for each t=1, ..., T+1, we have $$E(r \mid e_t) = E(r(Y) \mid e_t) + \sum_{d=1}^{D-1} E(r(Z_d) \mid e_t) \quad (31)$$

$$= p_D E(y \mid e_t) + \sum_{d=1}^{D-1} p_d E(Z_d \mid e_t)$$

Now using straightforward derivations we can calculate the values of $E(y|e_t)$ and $E(z_d|e_t)$ for all t=1, ..., T+1, and also probabilities $Pr(e_t)$, substitute them into formulas (31) and (30), and obtain the expected category revenue R which could be optimized in category price vector p under appropriate constraints.

The cases with multiple clear-out products are more involved technically but can be solved similarly.

Multiple Products—Clearance Price—Composite Period

The situation is similar to the previous case, but is still more complex because composite period introduces additional technical difficulties.

Regression Modeling and Objective Function Construction

Figure 7:
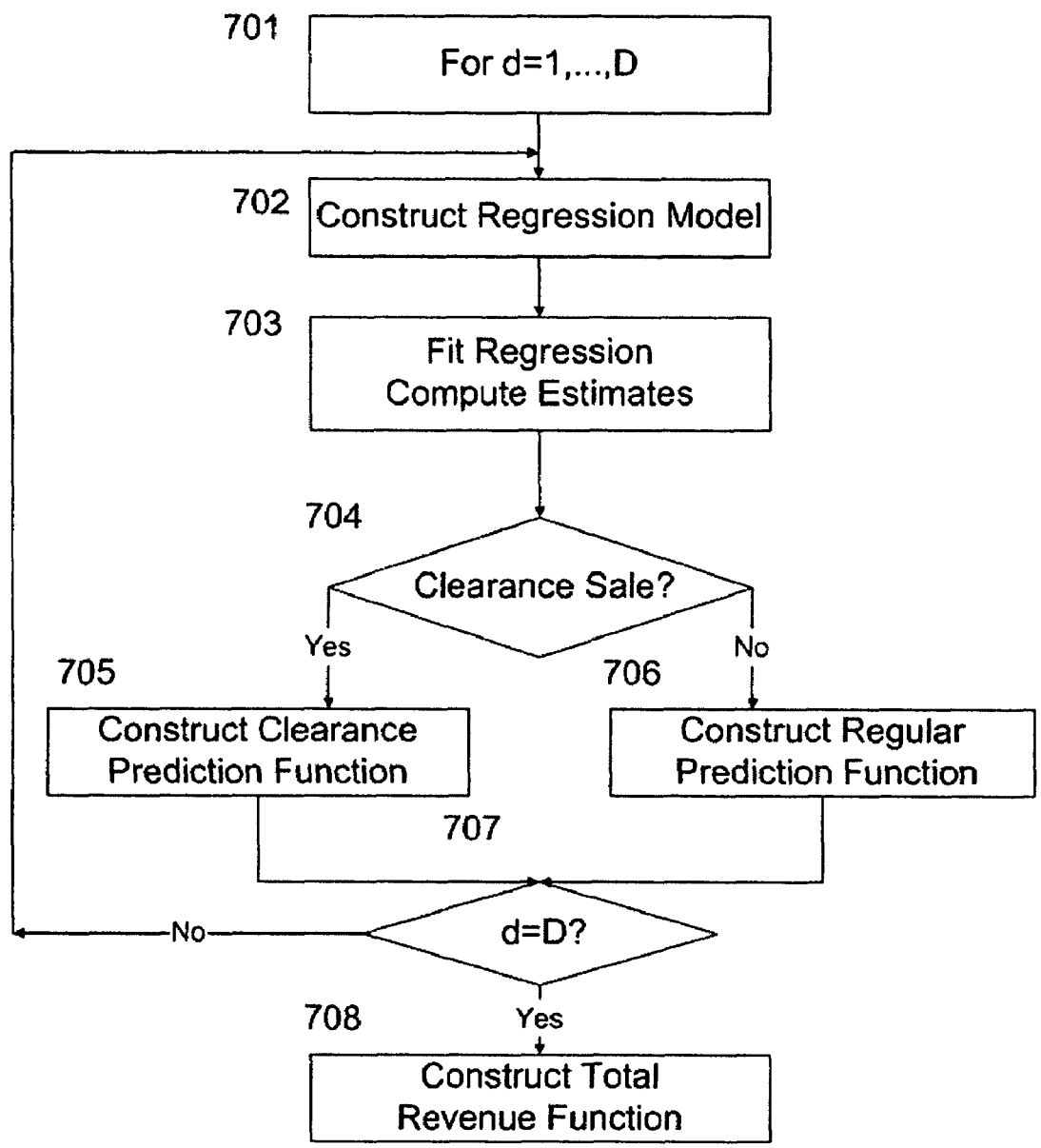
FIG. 7: Pricing: Regression Modeling and Objective Function Construction

The process is shown for a group of products in the flow-chart in FIG. 7. For each product in the group (Block 701), a regression model is constructed (Block 702), and fitting and estimation are performed (Block 703). If a 'clearance sale scenario' has been selected by the user (Block 704), a clearance objective function is selected for the given product in Block 705; otherwise, a regular objective function is selected in Block 706. When all individual objective functions have been constructed (Block 707), the total group objective function is constructed in Block 708.

Pricing Optimization

For a group of products, optimization has to be done in multidimensional pricing space and therefore is much more difficult than for a single product. In this invention, this optimization is done by a proprietary software based on the method of feasible directions. Current values of the prices serve as initial values in the algorithm.

Error Estimation and Significance Testing

There are two steps here: Estimation of prediction errors and of other measures of statistical precision, and significance testing of optimal revenue.

Estimation of Prediction Errors and of Other Measures of Statistical Precision

We use statistical bootstrap (Efron and Tibshirani, 1993) for estimating measures of statistical precision: prediction errors, standard deviations and biases. Bootstrap mimics real computations with theoretical values replaced by the observed values, and the real distribution replaced by a bootstrap distribution. In particular, regression model construction is replaced by bootstrapping the 'true' regression model, fitting and estimation is performed on each bootstrapped regression model, and then optimization of revenue and computation of optimal price is performed for each set of bootstrapped estimates. As a result, the following estimates are computed: bootstrap estimate of prediction error for maximum revenue $\hat{err}_{Boot}(R)$, bootstrap estimate of revenue standard deviation $\hat{sd}_{Boot}(R)$, bootstrap estimate of bias of maximum revenue $\hat{bias}_{Boot}(R)$. Similar quantities are computed for optimal prices.

First we consider computations for a single product. Let $R_{sale}$ denote the optimal revenue, and $R*^b_{sale}$ the optimal revenue for a bootstrapped model b where b=1, ..., B are bootstrapped replications. The following estimates are computed:

The Mean of Bootstrapped Maximum Revenues $$\bar{R}^*_{sale} = \sum_{b=1}^{B} R^{*b}_{sale} / B$$

Bootstrap Estimate of Mean Squared Error for Maximum Revenue $R_{sale}$ $$M\hat{S}E_{Boot}(R) = \left(\sum_{b=1}^{B} (R^{*b}_{sale} - R_{sale})^2\right) / B$$

Bootstrap Estimate of Prediction Error for Maximum Revenue $R_{sale}$ $$\hat{err}_{Boot}(R) = (M\hat{S}E_{Boot}(R))^{1/2}$$

Bootstrap Estimate of Revenue Variance (the Bootstrap Sample Variance)

$$\hat{\text{var}}_{Boot}(R) = \left(\sum_{b=1}^{B}(R_{sale}^{*b} - \overline{R}_{sale}^{*})^2\right) / (B-1)$$

Bootstrap Estimate of Revenue Standard Deviation (the Bootstrap Sample Standard Deviation)

$$\hat{sd}_{Boot}(R) = (\hat{\text{var}}_{Boot}(R))^{1/2}$$

Bootstrap Estimate of Bias of $R_{sale}$ $$\hat{bias}_{Boot}(R) = \overline{R}^{*}_{sale} - R_{sale}$$

Similar quantities are computed for an optimal price.

Significance Testing of Optimal Revenue for a Single Product

After an optimal predicted revenue $R_{sale}$ and an optimal price $p_{sale}$ have been calculated, it should be tested if the predicted revenue $R_{sale}$ is significantly different from the current revenue $R_{cur}$. In particular, it may happen that considerable changes in price translate into negligible revenue changes.

We will be testing the hypothesis $$H_0: ER_{sale} = \hat{R}_{cur}$$

against the one-sided alternative $$H_1: ER_{sale} > \hat{R}_{cur}$$

Note that $\hat{R}_{cur}$ is a smoothed value of current revenue computed as the predicted revenue at the current period. The test statistic is $$t = R_{sale} - \hat{R}_{cur}$$

The bootstrap null distribution is $$t^{*b} = R^{*b}_{sale} - R_{sale}$$

for b=1, ..., B. The value of the computed bootstrap p-value p*(t) represents evidence for or against the null hypothesis $H_0$: for small p-values it should be rejected.

Group Significance Testing

Prediction errors, standard deviations and biases are estimated for all products in a group exactly as shown above for a single product. Group significance testing, however, is different. Firstly, we have a group total revenue and a vector of individual revenues, and while the group revenue can not go down after optimization, some of the individual revenues can. Secondly, testing individual revenues is done according to the theory of multiple hypothesis testing. Thirdly, there may be cases when the group total revenue increases significantly while some or even all individual revenue changes are insignificant.

Figure 8:
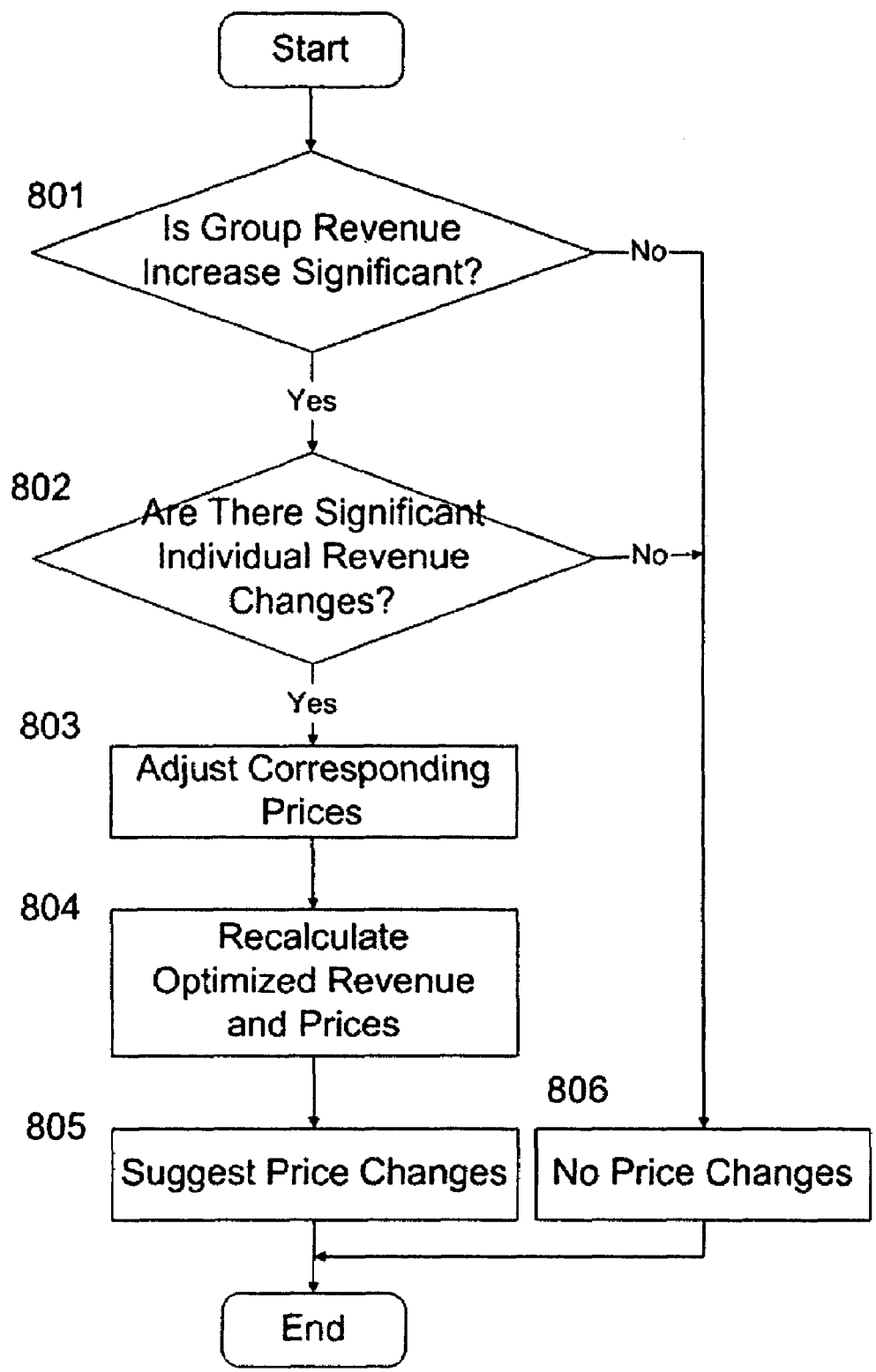
FIG. 8: Pricing: Group Significance Testing

Flow-chart in FIG. 8 shows major computational steps of group significance testing. In Block 801, a bootstrap one-sided test for the group total revenue is performed, and if found insignificant, the procedure terminates with no price changes suggested (Block 806). If the test is significant, however, all individual revenue changes are tested by a bootstrap multiple testing procedure with one-sided individual tests in Block 802, and if no significant changes are found, the procedure terminates with no price changes suggested. If some of the individual revenue changes are significant, the corresponding prices are adjusted in Block 803, and a recalculation of optimal total revenue is performed in Block 804. The newly optimized prices are suggested as new prices in Block 805.

Promotion Scheduling Modeling

The aim of promotion scheduling at any given time is construction of the next optimized schedule. At the Initial Period, scheduling is done by a non-statistical Initial Promotion Scheduling Procedure that produces random time grids for allocating promotion clips on the in-store monitors. Afterwards, scheduling is being performed by the Promotion Scheduling Procedure.

Promotion Scheduling Procedure

At a current time period k, we do the following. First, we choose a set of best schedules from all the available (already constructed) schedules, then perform local regression modeling and optimization in the vicinity of each of them, then select the schedule with the most promising predicted revenue increase, and then test its significance. If it is, the local improvement is attempted; otherwise a new scheduling point close to already existing points is added.

For any schedule corresponding to period s, we will be doing local regression fitting and estimation, and optimization of predicted revenue increase by maximizing linear revenue increment dR under corresponding restrictions. It can be written as $$dR = \sum_{d=1}^{D}\sum_{j=1}^{J} A_{d,j} dx_{d,j} \qquad (32)$$

where $$A_{d,j} = R_d \hat{\beta}_{d,j} \qquad (33)$$

$R_d$ are the predicted values of individual product revenues at the scheduling point $X_{(s)}$, $\hat{\beta}_{d,j}$ are the promotion scheduling coefficient estimators, $dx_{d,j}$ are the promotion time changes, i.e. increments in the scheduling space that are control variables in maximization. Each $R_d$ in (33) can be written as $$R_d = p_d \exp(x_d^T \hat{\beta}_d + a_d) \qquad (34)$$

where $$a_d = g^T \hat{\gamma}_d + p^T \hat{\pi}_d + \hat{\sigma}_d^2 \qquad (35)$$

Here $x_d$ is the schedule for product d at period s, g is the common factors vector at period s, p is the category price vector at period s, $\hat{\beta}_d$ is the promotion scheduling coefficient estimate, $\hat{\gamma}_d$ is the common factors coefficient estimate, $\hat{\pi}_d$ is the price coefficient estimate, and $\hat{\sigma}_d^2$ is the variance estimate. Before maximizing dR we have to know or to estimate these quantities. The quantities $x_d$, g, p are known while the estimates $\hat{\beta}_d$, $\hat{\gamma}_d$, $\hat{\pi}_d$ and $\hat{\sigma}_d^2$ are to be selected. For $\hat{\gamma}_d$ and $\hat{\pi}_d$ we take the most recently computed estimates, i.e. $\hat{\gamma}_{d(k)}$ and $\hat{\pi}_{d(k)}$. As for $\hat{\beta}_d$ and $\hat{\sigma}_d^2$, they are computed by locally weighted regressions by using all the neighboring points of the scheduling point $X_{(s)}$. Substituting these estimates into (35), (34), (33) and (32), we obtain dR that can be maximized in control variables $dx_{d,j}$.

After local optimizations have been performed for all s, the corresponding revenue increases are compared, and the best scheduling point is selected and tested for statistical significance. If significant, the corresponding optimized promotion schedule is constructed; otherwise, a new scheduling point in the vicinity of the existing schedules is constructed with the purpose of increasing the density of the data points in the exploration region and giving a better chance of obtaining significant revenue increase at a later period.

Promotion Scheduling Procedure: Algorithmic Description

Figure 9:
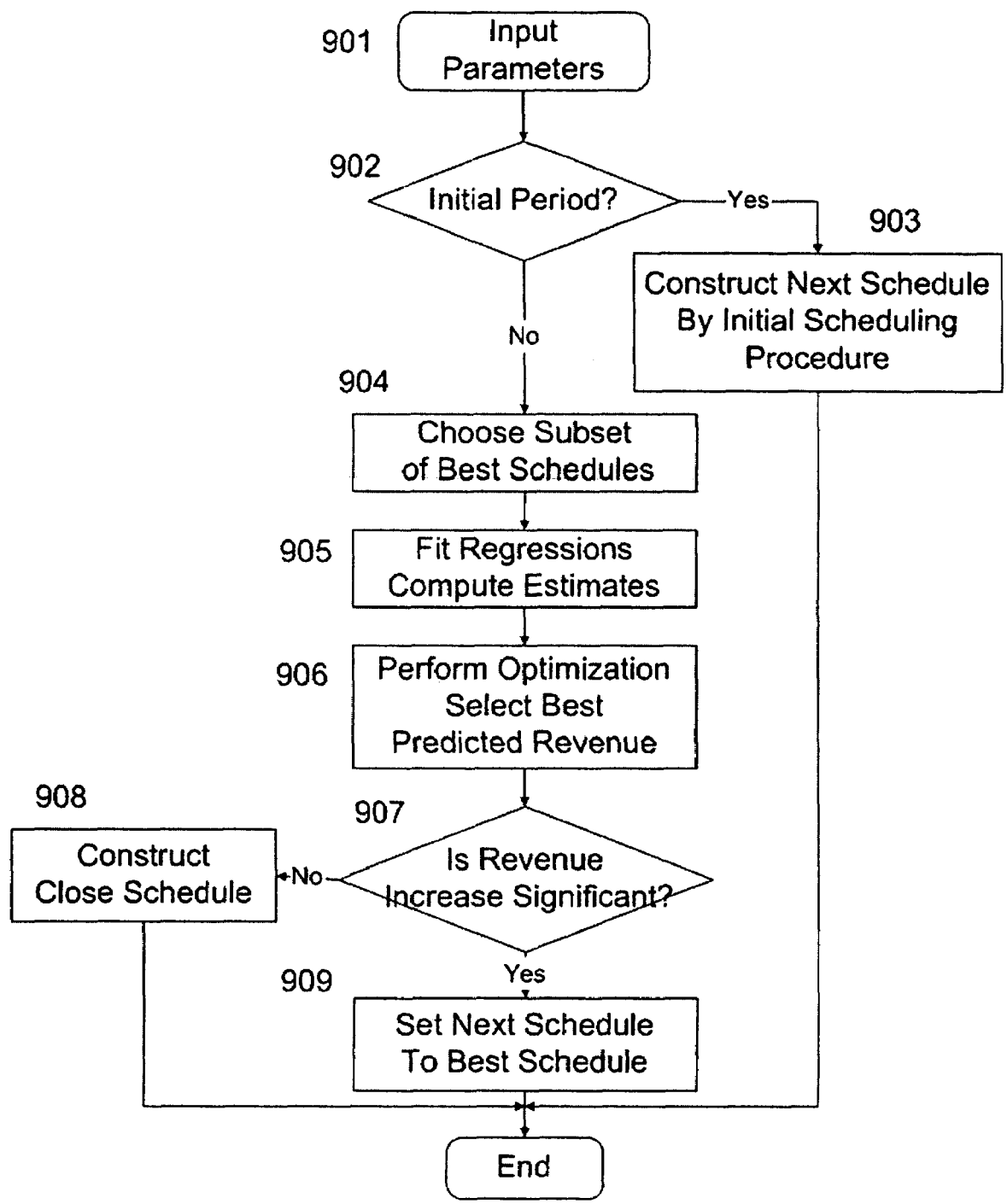
FIG. 9: Promotion Scheduling Procedure

Promotion Scheduling Procedure containing 5 steps is described with reference to flow-chart in FIG. 9. In Block 901, all input parameters are entered. If the current period is the Initial Period (Block 902), the next schedule is computed by the Initial Promotion Scheduling Procedure (Block 903), otherwise Step 1 is performed:

Step 1 (Block 904). Choose a subset of best schedules from all available schedules.

Step 1 is done by the Selection of Best Schedules Procedure that selects a best schedule subset containing the best schedule and all other schedules that lie witching a confidence set of the best schedule.

Step 2 (Block 905). For all best schedules, fit regressions and compute regression estimates.

Step 2 is performed by the Promotion Estimation Procedure that uses locally weighted regressions with data-driven rules for band-width selection.

Step 3 (Block 906). For all best schedules, perform local promotion optimization and select the best predicted revenue.

Step 4 (Block 907). Test whether the best predicted revenue gives significant increase.

This is done by the Bootstrap Multiple Significance Test of Revenue Increase in Promotion Scheduling that performs multiple hypothesis testing based on bootstrap resampling for construction of null distributions.

If the result at Step 4 was 'significant', the best computed schedule is set as the next promotion schedule in Block 909; otherwise, Step 5 is performed:

Step 5 (Block 908). Construct a new promotion schedule in the vicinity of the existing schedule points Construction of a new promotion schedule in the vicinity of the given schedule is done by the Construction of Close Promotion Schedule Procedure; it makes random steps from the center of the set of existing schedules in the scheduling space.

Pricing-Promotion Estimation-Optimization Loop

From equation (22) we see that for estimation of a pricing model with no promotions we have to fit the equations $$U_d = G\gamma_d + P\pi_d \qquad (36)$$

while for estimation of a promotion model under constant prices we have to fit $$U_d = X_d\beta_d + \epsilon_d \qquad (37)$$

Fitting of equations (36)-(37) is going to be done in a stepwise manner, say, daily, using the sales data in the historical database up to the current day. It will be assumed that at the very start, there are available sales data for some previous period, say, one or two years. On the other hand, it is not assumed that detailed data on promotional activities have been stored in the database. As a result, we can construct at the start large enough matrices G and P though not matrices $X_d$. Therefore, at the initial period prices could be estimated and optimized while promotion schedules would be generated by an Initial Promotion Scheduling Procedure irrespective of availability of historical data on promotion scheduling. After the initial period is over, promotion coefficients could be estimated by regression methods.

The situation may be quite different for pricing optimization. Firstly, influence of prices on sales appears to be much stronger than that of promotion displays. Secondly, a historical database is likely to contain abundant and detailed price records related to sales. Thus, even at the start, we are likely to have enough reliable data on pricing to be able to fit corresponding regression equations. Therefore, for a considerable period of time, we may have to deal with the equation (36) rather than the equation (22). However, even after the Initial Period is over, and equation (22) can be estimated, it may still contain too many parameters, so that we may prefer to fit separately (36) and (37). Besides an opportunity to use different chunks of data for fitting equations (36) and (37), we can also use different estimation methods, say, linear regression for pricing and locally weighted regression for promotions.

The estimation-optimization loop consists of Preparatory Step, Initial Period and Main Period (see FIG. 1). Here we describe the Initial and Main Periods.

Initial Period

Figure 10:
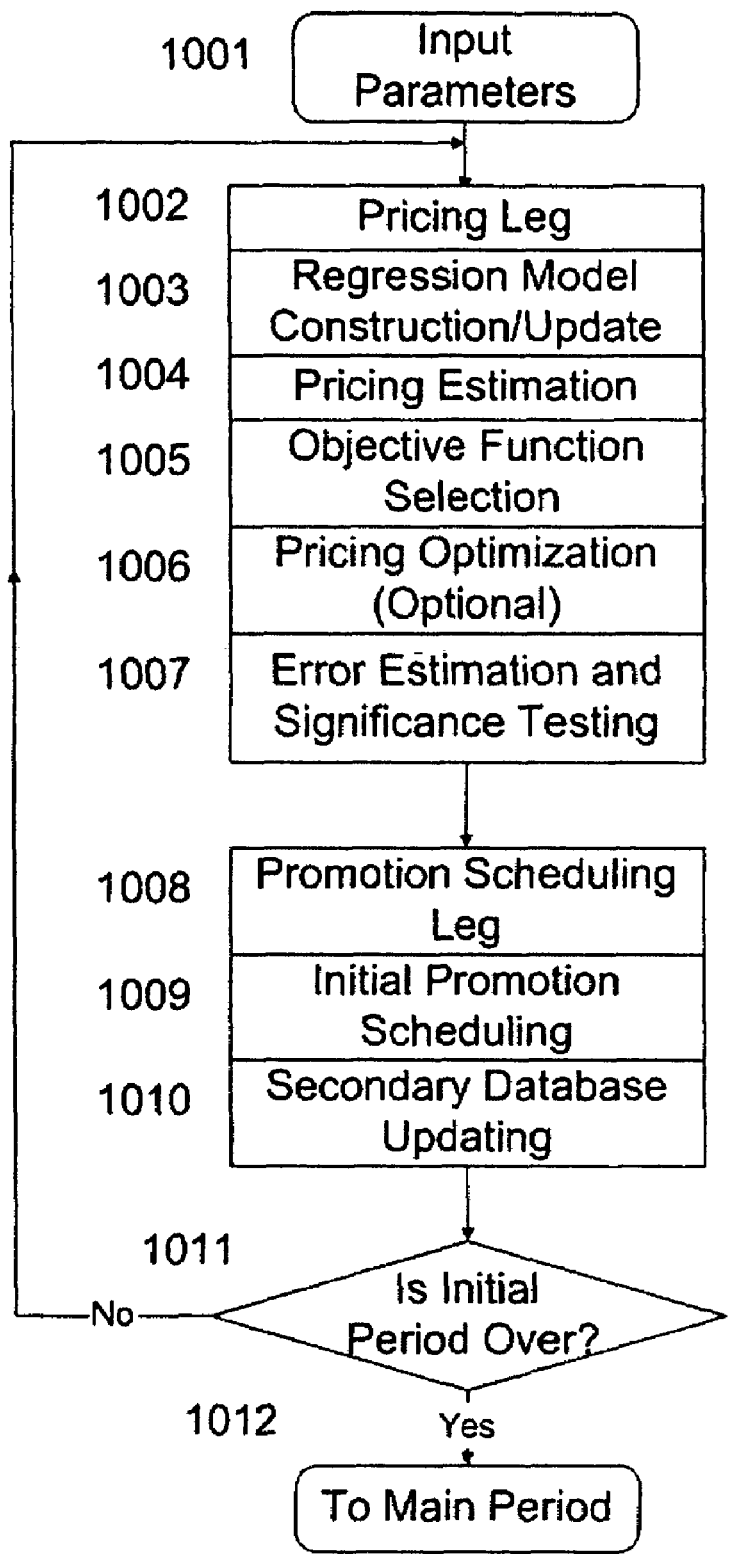
FIG. 10: Pricing-Promotion Estimation-Optimization Loop: Initial Period

FIG. 10 shows a flow-chart of the Initial Period containing a finite number of iterations over a fixed time period that has default duration of one day but may be changed by the user. There are two major parts here: Pricing Leg and Promotion Scheduling Leg. After inputting parameters in Block 1001, the loop over time periods begins. First comes the Pricing Leg (Block 1002) containing Blocks 1003 to 1007. By mining the secondary database, Regression Model Construction/Update Procedure constructs regression model (36) in Block 1003. In Block 1004, the Separate Pricing Estimation Procedure fits equations (36) and obtains regression estimates. In Block 1005, an objective function is selected according to input parameters and user-selected options. In Block 1006, pricing optimization is performed provided the user requested it. Regular or clearance category prices are computed depending on user's requests. Error analysis and significance testing of obtained prices are performed in Block 1007; probable errors in revenues and prices implied by uncertainty in the data are computed. Promotion Scheduling Leg starts in Block 1008. In Block 1009, Initial Promotion Scheduling Procedure Computes initial (non-statistical) promotion time allocation for a product category. Secondary database updating is done in Block 1010. When the Initial Period is over (Block 1011), the control is passed to the Main Period in Block 1012, otherwise a new iteration begins.

Main Period

Figure 11:
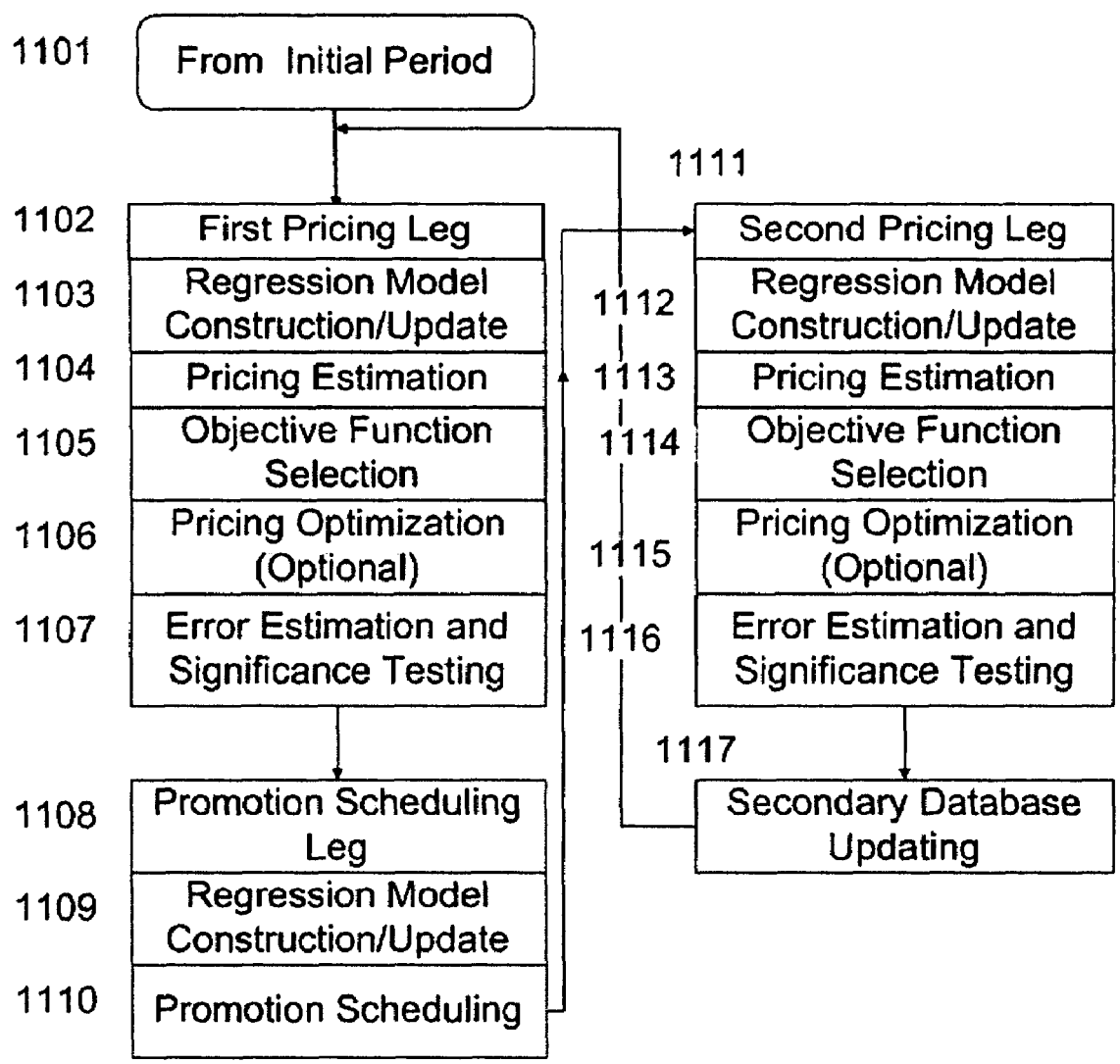
FIG. 11: Pricing-Promotion Estimation-Optimization Loop: Main Period

The Main Period contains First Pricing Leg, Promotion Scheduling Leg and Second Pricing Leg (FIG. 11), and allows a potentially infinite number of iterations. The First Pricing Leg (Blocks 1102 to 1107) functions the same way as the Pricing Leg at the Initial Period, the main difference being that the regression model here contains promotion part as well. Promotion Scheduling Leg (Blocks 1108 to 1110) contains modules for Regression Model Construction/Update (Block 1109) and Promotion Scheduling Procedure for obtaining a next promotion schedule (Block 1110). It either computes optimal promotion time allocation for a product category or adds a new close schedule in the scheduling space. Second Pricing Leg (Blocks 1111 to 1116) differs from the First Pricing Leg in that the influence of promoting enters into the regression model, so that numerical results will in general be different. Secondary Database Updating is done in Block 1117, after which the next iteration starts.

User's Interface Module

Figure 12:
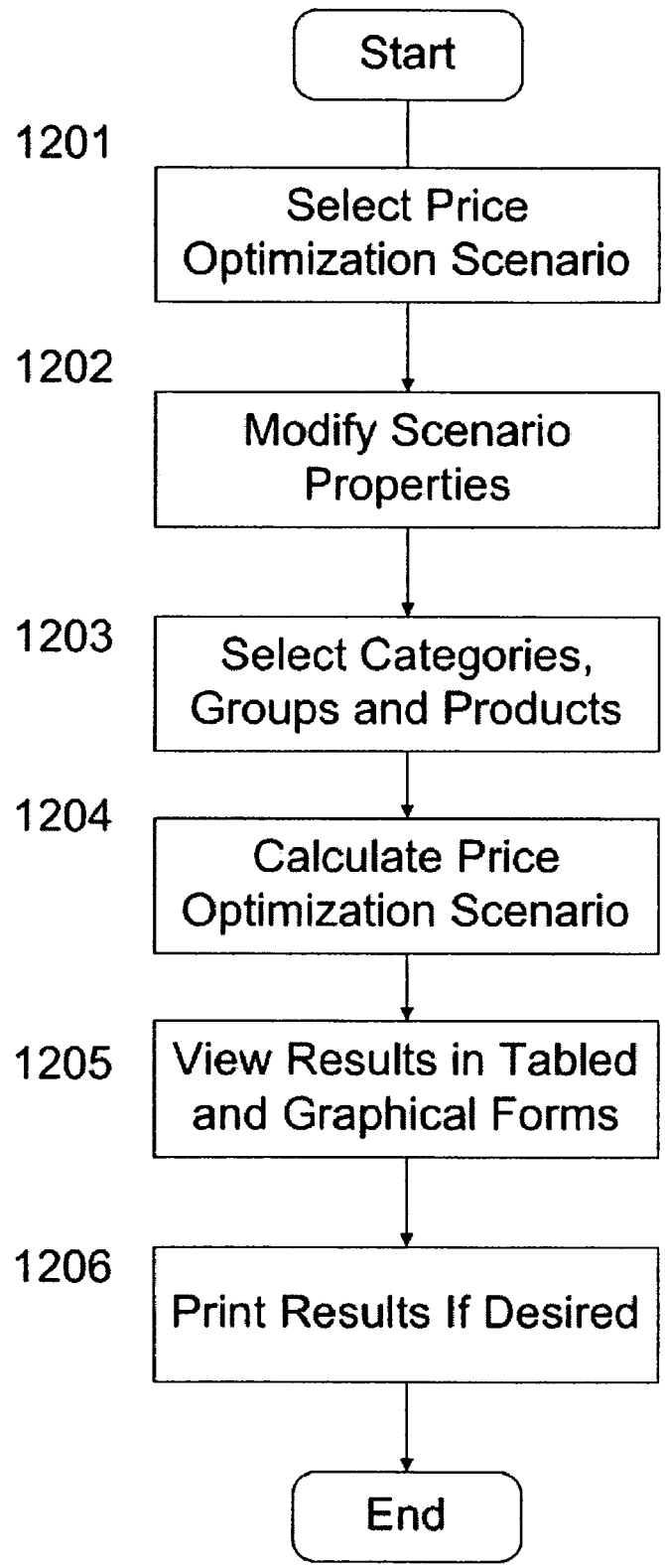
FIG. 12: User-System Interaction via Price Optimization Scenarios

For performing tasks like pricing optimization, sales forecasting or setting up promotion scheduling the system has to receive from the user a number of option selections, parameter and variable values. Those selections are arranged into three frameworks: Pricing Optimization Scenarios, Pricing Prediction Scenarios, and Promotion Scheduling Scenarios. In all scenarios, the user is presented with a series of screens on which he is requested to tic menu options, make selections and enter input parameter values. By so doing, the user effectively creates a computation scenario to be executed by the system at a later stage. After the user has made the required option selections and filled in the slots with parameter values, the Scenario Processor transforms the underlying scenario into the form suitable for feeding it into the computation engine, then requests from the computation engine to perform the necessary computations, and afterwards presents to the user a report that contains the results in an easy to read form. Pricing Optimization Scenarios FIG. 12 gives a schematic presentation of user-system interaction via price optimization scenarios. After selecting a price optimization scenario in Block 1201, the user modifies scenario properties by ticking menu options and making selections in Block 1202, and selects product categories, product groups and products in Block 1203. When he activates the system in Block 1204, the computations begin. After the system's computation process is over, the user can look at the reports and analyze results in tabled and graphical forms in Block 1205. By default, the system saves scenarios complete with reports for a later review. If the results are deemed satisfactory, the user can print them if he so wishes in Block 1206. Alternatively, he can make changes in menu selections and input parameters and request a new round of computations.

Pricing Optimization Scenarios contain the following options:

Select task—pricing

Select goal—optimization

Select figure-of-merit, i.e. revenue or profit

Select grouping mode—individual or group

Select pricing mode—regular or clearance

Select product categories, product groups, and products

Select scenario name

Select execution mode—immediate or delayed

Pricing Optimization Scenario Reports

In the preferred embodiment, Pricing Optimization Scenario Reports contain the following major screens.

Screen 1 presents the list of scenarios that have been calculated and saved for future reference. For constructing a new scenario, the user clicks Scenarios on the Menu Bar, and then on the drop-down menu clicks New Scenario.

Screen 2 shows the Modify Scenario Properties menu. The user selects desired scenario properties (parameters) by checking the corresponding options: on the Goal pane he checks Optimization, on the Figure of Merit pane he checks Revenue which means that group revenue will be optimized, on the Grouping Mode pane he checks Group.

Screen 3 presents a product selection menu; here the user has to select product categories and product groups in the selected categories. If he is interested only in particular products in the selected groups he can select them as well. All selections are done by ticking the desired items on the tree structure on the upper left pane or alternatively on the alphabetical list on the bottom pane. Then the user clicks Select Checked Items at the bottom and the desired items appear on the right half of the screen.

Screen 4, Save and Calculate, gives an option to select a name for our scenario and either to calculate it immediately or save it without calculation. Click on Go performs the calculations.

After calculation, the scenario appears on Scenario List page under the given name. To review the results, the user goes to that page, clicks on the scenario, then clicks Review Scenario, and Scenario Reports.

Screen 5 shows the Scenario Reports pane featuring a tree on the left. The tree provides pointers to key output data in the scenario reports that may be displayed in tables on the right.

Clicking a group name node and then Product Pricing nodes opens 18 kinds of price indices and error indicators for all products in the selected group. Six of them are common indices, six refer to Unconditional Optimization, and six to Conditional Optimization. Common indices are Current Price, Lowest Price, Highest Price, Minimum Price, Maximum Price, and Base Price. Lowest Price and Highest Price are calculated for the available sales period. Minimum Price, Maximum Price and Base Price for a product are set by Administrator. Optimal Price, Price Change Price and Change % are calculated by the System using prediction and optimization models based on the historical sales data. The remaining indices relate to conditional optimization when some of the prices in the group are not allowed to be changed by the user.

Screen 6 shows the prices in graphical form. Three kinds of prices are graphically compared for all products in the group. Visual representation provides easier comprehension and price comparisons but lacks statistical indices given in the tables.

Screen 7 shows the Scenario Reports for product revenues. Expanding the Group Revenues node shows 13 revenue indices and error indicators on the right. The Current Revenue is a common index, six indices refer to Unconditional Optimization, and six to Conditional Optimization. The meanings of the indices are similar to those for prices.

Pricing Prediction Scenarios

In contrast to optimization scenarios, here the main output is forecasts based on user-suggested prices. To request a forecast, the user defines a product, or a product category, or a group in a category, the corresponding prices (which may be current prices or any prices of his choosing), the figure of merit to be forecasted, and a target period for forecasting. Then the Scenario Processor transforms the underlying scenario into the form suitable for feeding it into the computation engine, then requests from the computation engine to perform the necessary computations, and afterwards presents to the user a report that contains the results in an easy to read form.

Figure 13:
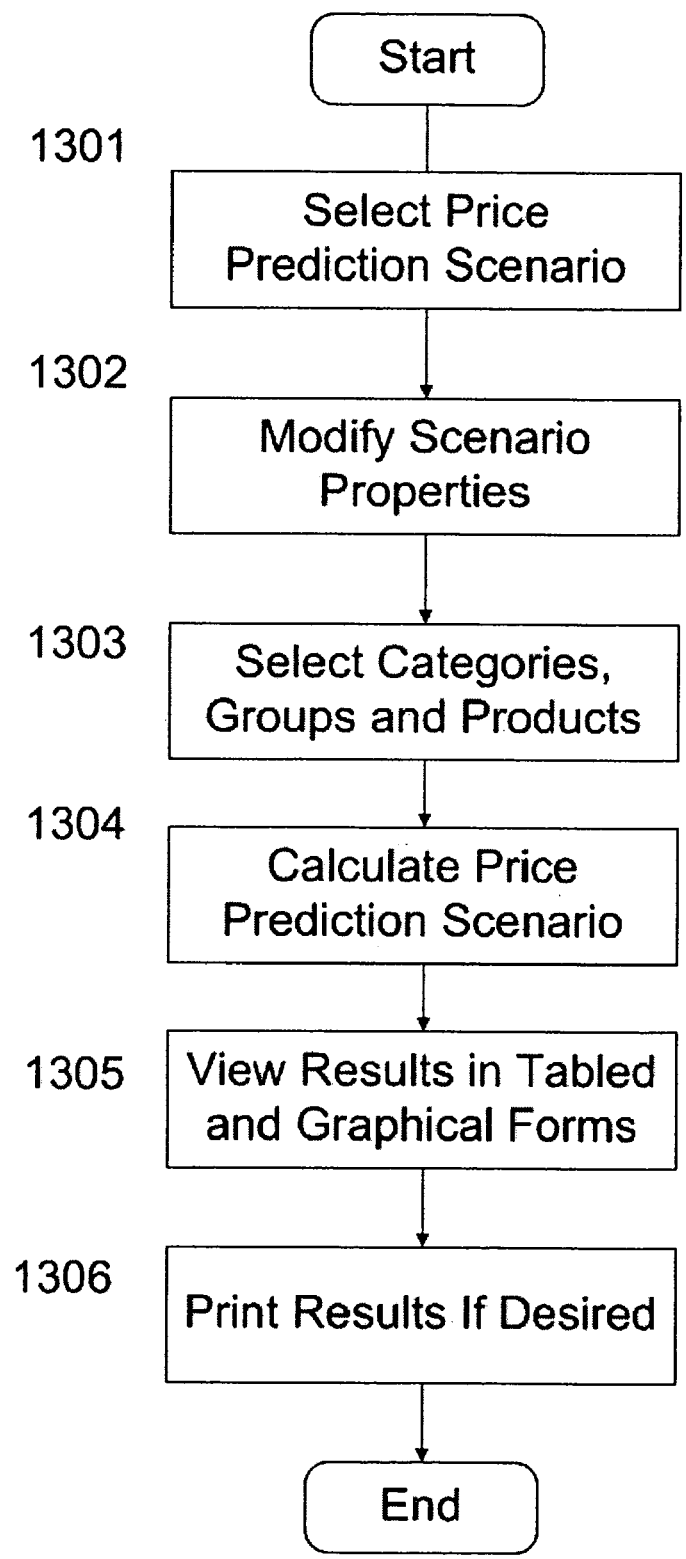
FIG. 13: User-System Interaction via Price Prediction Scenarios

FIG. 13 gives a schematic presentation of user-system interaction via price prediction scenarios. After selecting a price prediction scenario in Block 1301, the user modifies scenario properties in Block 1302, and selects product categories, product groups and products in Block 1303. When he activates the system in Block 1304, the computations begin. After the system's computation process is over, the user can look at the reports and analyze results in tabled and graphical forms in Block 1305. By default, the system saves scenarios complete with reports for a later review. If the results are deemed satisfactory, he can print them if he so wishes in Block 1306. Alternatively, he can make changes in menu selections and input parameters and request a new round of computations.

Pricing Prediction Scenarios contain the following options:

Select task—pricing

Select goal—forecasting

Select grouping mode—individual or group

Select pricing mode—regular or clearance

Select product categories, product groups, and products

Select scenario name

Select execution mode—immediate or delayed

Pricing Prediction Scenario Reports

In the preferred embodiment, Pricing Prediction Scenario Reports contain the following major screens.

Screen 1 presents the list of scenarios that have been calculated and saved for future reference. For constructing a new scenario, the user clicks Scenarios on the Menu Bar, and then on the drop-down menu clicks New Scenario.

Screen 2 shows the Modify Scenario Properties menu. The user selects desired scenario properties (parameters) by checking the corresponding options: on the Goal pane he checks Forecasting, on the Grouping Mode pane he checks Group.

Screen 3 presents us with a product selection menu; here the user has to select product categories and product groups in the selected categories. If he is interested only in particular products in the selected groups he can select them as well. All selections are done by ticking the desired items on the tree structure on the upper left pane or alternatively on the alphabetical list on the bottom pane. Then he clicks Select Checked Items at the bottom and the desired items appear on the right half of the screen.

Screen 4, Save and Calculate, gives an option to select a name for the scenario and either to calculate it immediately or save it without calculation. Click on Go performs the calculations.

After calculation, the scenario appears on the Scenario List page under the given name. To review the results, the user goes to that page, clicks on the scenario, then clicks Review Scenario, and Scenario Reports.

Screen 5 shows the Scenario Reports pane featuring a tree on the left. The tree provides pointers to key output data in the scenario reports that may be displayed in tables on the right. Clicking a group name node and then Product Pricing nodes opens 9 kinds of price indices for all products in the selected group. Those include Current Price, Suggested Price, Price Change, Price Change %, Lowest Price, Highest Price, Minimum Price, Maximum Price, and Base Price. Lowest Price and Highest Price are calculated for the available sales period. Minimum Price, Maximum Price and Base Price for a product are set by Administrator.

Screen 6 shows the prices in graphical form. Visual representation provides easier comprehension and price comparisons but lacks statistical indices given in the tables.

Screen 7 shows the Scenario Reports for product revenues. Expanding the Group Revenues node shows 7 revenue indices on the right. The meanings of the indices are similar to those for prices.

Promotion Scheduling Scenarios

Promotion Scheduling module differs from the Pricing Optimization module and Pricing Prediction module in that it constitutes_an_autonomous block_within the system that functions continuously, in general without user's intervention, and changes promotion schedules according to pre-defined time frames. The ongoing consequences of promotion optimization are absorbed into the database in the form of demand changes without providing any reports or messages to the user unless and until the user explicitly requested them or expressed his desire to introduce modifications into promotion schedules in the form, say, of restricting demonstration times of certain clips on certain monitors. In such a case, he will be presented with a number of options for modifying promotion scheduling or reports as the case may be. Of course, if the user decided to introduce modifications into the promotion network, the ensuing promotion schedules will not be optimized in the original sense, but will be only conditionally optimal.

Figure 14:
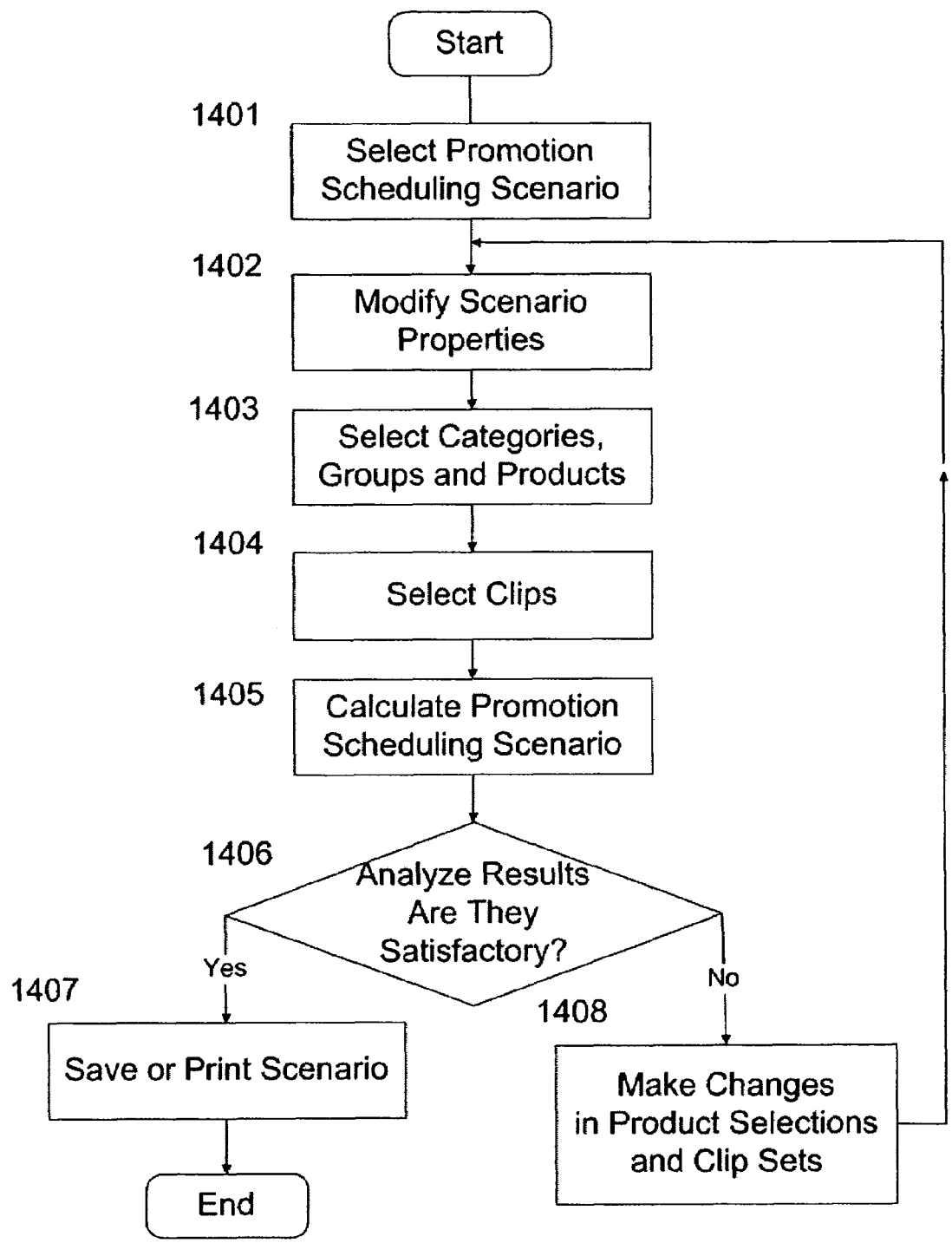
FIG. 14: User-System Interaction via Promotion Scheduling Scenarios

FIG. 14 gives a schematic presentation of user-system interaction via promotion scheduling scenarios. After selecting a promotion scheduling scenario in Block 1401, he modifies scenario properties in Block 1402, selects product categories, product groups and products in Block 1403, and selects promotion clips he wishes to run on.

the in-store monitors for promotion purposes in Block 1404. When he activates the system in Block 1405, the computations begin. After the system's computation process is over, the user can look at the reports and analyze results in tabled and graphical forms in Block 1406. If the results are deemed satisfactory, he can save or print the scenario results if he so wishes in Block 1407. Alternatively, he can modify product selections and clip sets in Block 1408, and request a new round of computations.

Promotion Scheduling Scenarios contain the following options:

Select task—promotion

Select goal—optimization

Select grouping mode—individual or group

Select pricing mode—regular or clearance

Select product categories, product groups, and products

Select scenario name

Select execution mode—immediate or delayed

Promotion Scheduling Scenario Reports

In the preferred embodiment, Promotion Scheduling Scenario Reports contain the following major screens.

Screen 1 presents the list of scenarios that have been calculated and saved for future reference. For constructing a new scenario, the user clicks Scenarios on the Menu Bar, and then on the drop-down menu clicks New Scenario.

Screen 2 shows the Modify Scenario Properties menu. The user selects desired scenario properties (parameters) by checking the corresponding options: on the Goal pane he checks Promotion Scheduling, on the Figure of Merit pane he checks Revenue which means that group revenue will be optimized, on the Grouping Mode pane he checks Group.

Screen 3 presents a product selection menu; here the user has to select product categories and product groups in the selected categories. If he is interested only in particular products in the selected groups he can select them as well. All selections are done by ticking the desired items on the tree structure on the upper left pane or alternatively on the alphabetical list on the bottom pane. Then the user clicks Select Checked Items at the bottom and the desired items appear on the right half of the screen.

Screen 4 presents a promotion clip selection menu; here the user has to select promotion clips he wishes to run on the in-store monitors for promotion purposes. If he is interested only in promoting particular products or groups he can select them as well. All selections are done by ticking the desired items on the tree structure on the upper left pane or alternatively on the alphabetical list on the bottom pane.

Screen 5, Save and Calculate, gives an option to select a name for our scenario and either to calculate it immediately or save it without calculation. Click on Go performs the calculations.

After calculation, the scenario appears on Scenario List page under the given name. To review the results, the user goes to that page, clicks on the scenario, then clicks Review Scenario, and Scenario Reports.

Screen 6 shows the Scenario Reports pane featuring a tree on the left. The expected sales from optimized promotion may be displayed in tables on the right.

Screen 7 shows the expected sales from optimized promotion in graphical form. Visual representation provides easier comprehension and price comparisons but lacks statistical indices given in the tables.

Screen 8 allows the user to make changes in product selections and clip sets used in promotion.

What is claimed is:

1. A decision support system that uses a merchandising parameter including a revenue or a profit, the support system comprising:
    prediction means for predicting a product demand for a plurality of non-identical products in a target period using predetermined purchasing data and predetermined pricing factors for the plurality of non-identical products;
    optimization means for optimizing a price and a promotion schedule of at least one of the non-identical products for the target period, the optimization means maximizing the merchandising parameter based on the predicted product demand for the plurality of non-identical products;
    a database for storing the predetermined purchasing data, the predetermined pricing factors, the optimized price and the optimized promotion schedule, the predetermined purchasing data including scanner data or historical purchase data that contains at least a date of purchase, a time of purchase, a bar code, a quantity bought and a price at the time of purchase;
    means for modeling and optimization of joint effects of the predetermined purchasing data and the predetermined pricing factors, said predetermined pricing factors including one or more of product brands, sales discounts, quantity discounts, promotion schedules, days of the week, pre-holiday days, post-holiday days, year seasons, and past sales histories of the plurality of non-identical products;
    means for data mining of the said historical database that performs aggregation of individual sale and promotion records into data batches corresponding to user-selected or system-determined time periods, and of extracting the contents of database fields corresponding to the said predetermined pricing factors;
    means for construction of an integrated pricing and promotion regression model or of a set of integrated pricing and promotion regression models to model joint effects of the plurality of said predetermined purchasing data and said predetermined pricing factors including pricing and promotion variables on the product demand of the plurality of non-identical products on sale;
    means for simultaneous estimation of said integrated pricing and promotion regression model or said set of integrated pricing and regression models and for separate stepwise estimation;
    means for construction of the predicted demand for products in categories with substitute demands and with complementary demands;
    means for separately demonstrating effects of prices on said predicted product demand in said categories based on said means for estimation;
    means for separately demonstrating effects of display times of a plurality of promotion clips running on in-store monitors on said predicted product demand in said categories based on said means for estimation;
    means for providing said database containing filtered data used for estimation computations, the filtered data including fields directly corresponding to regression factors in said integrated pricing and promotion regression models, and storing them in a format for reading and processing;
    the optimization means further:
    a) for optimizing a selected merchandising parameter for user-selected single products under regular sales conditions;
    b) for optimizing a selected merchandising parameter for user-selected product groups under regular sales conditions;
    c) for optimizing a selected merchandising parameter for user-selected single products under clearance sales conditions;
    d) for optimizing a selected merchandising parameter for user-selected product groups under clearance sales conditions;
    e) for constructing scenario reports that contains information units in tabled and graphical forms, the information units including a scenario task specification, all group profits, all group revenues, a group availability, an individual group task specification, individual group product pricing, individual group product profits, individual group product revenues, individual group product sales volumes, and individual group product availability, and
    for allowing a user to review price changes computed by the optimization system and to register a consent to the price changes through a password-protected channel between a user interface and the system prior to any implemented price changes.

2. A decision support system according to claim 1, wherein the means for data mining includes means for determining structure and sizes of said data batches for construction of said integrated pricing and promotion regression models to model effects of various promotion schedules.

3. A decision support system according to claim 1, wherein the means for data mining further includes means for detecting missing data in said historical database, and means for estimation of said missing data, the estimation of said missing data including calculating values for said missing data on the basis of the stored data for construction of said integrated pricing and promotion regression models.

4. A decision support system according to claim 1, wherein the means for data mining further includes means for detecting invalid data, the invalid data including one or more of incomplete data, incorrectly formatted data, out-ofrange data, and improbable data in said historical database, and means for correcting said invalid data including completion of said incomplete or said incorrect formats, and replacement of said out-of-range or said improbable values with values recalculated on the basis of the remaining valid data.

5. A decision support system according to claim 1, wherein the means for data mining further includes means for calculating robust summary statistics related to sales record batches for performance of said estimation of said integrated pricing and promotion regression models, the estimation performed by at least one of an ordinary least squares method, a weighted least squares method, and a generalized least squares method.

6. A decision support system according to claim 1, wherein said regression models contain weights that reflect sales volumes associated with said data batches.

7. A decision support system according to claim 1, wherein said regression models further separate the plurality of non-identical products on sale into product groups consisting of products with substitute demands and complementary demands.

8. A decision support according to claim 1, wherein the means for estimation updates said estimation with newly obtained sales data.

9. A decision support system according to claim 1, wherein the means for construction of the predicted demand accounts for mutual dependencies among sales of substitute and of complementary products.

10. A decision support system according to claim 1, wherein the means for demonstrating the effects of prices on the predicted product demand provides for price optimization.

11. A decision support system according to claim 1, wherein the means for demonstrating the effects of the display times provides for promotion optimization.

12. A decision support system according to claim 1, wherein said database stores newly obtained sales data in a format for reading and processing.

13. A decision support system according to claim 1, wherein the single product regular price optimization module comprises: a selected merchandising parameter a single product regular price; localization constraints related to a current product price; range constraints related to a product extreme price values as recorded in the database; and optional price range restrictions as imposed by the user according to a selected optimization scenario.

14. A decision support system according to claim 1, wherein the product category regular price optimization module comprises: a selected merchandising parameter of product group regular prices; localization constraints related to current group prices; range constraints related to group extreme price values as recorded in the database; and optional price range restrictions as imposed by the user according to a selected optimization scenario.

15. A decision support system according to claim 1, wherein the single product clearance price optimization module comprises: a selected merchandising parameter of a single product clearance price; localization constraints related to current product price; range constraints related to product extreme price values as recorded in the database; and optional price range restrictions as imposed by the user according to a selected optimization scenario.

16. A decision support system according to claim 1, wherein the single product clearance price optimization module computes predicted sales volumes and predicted leftover stocks.

17. A decision support system according to claim 1, wherein the product group clearance price optimization module comprises: a selected merchandising parameter of a mix of product group regular prices and product group clearance prices; localization constraints related to current group prices; range constraints related to group extreme price values as recorded in the database; optional price range restrictions as imposed by the user according to a selected optimization scenario.

18. A decision support system according to claim 1, wherein the product group clearance price optimization module computes predicted sales volumes and predicted leftover stocks for all clear-out products.

19. A decision support system according to claim 1, wherein the prediction error estimation module uses resampling methods for estimation of prediction errors, standard errors and biases in predicted single product optimal prices and in predicted group optimal price vectors.

20. A decision support system according to claim 1, wherein the prediction error estimation module further uses resampling methods for estimation of prediction errors, standard errors and biases in a single product merchandising parameter and in a group merchandising parameter.

21. A decision support system according to claim 1, wherein the significance-testing module uses resampling methods for testing significance of optimized price changes in predicted single product optimal prices and in predicted group optimal price vectors.

22. A decision support system according to claim 1, wherein the significance-testing module further uses resampling methods for testing significance of merchandising parameter changes for predicted single product optimal prices and for predicted group optimal price vectors.

23. A decision support system according to claim 1, wherein the sensitivity-assessing module comprises means for assessing sensitivity of the predicted single product price functions relative to price range restrictions.

24. A decision support system according to claim 1, wherein the sensitivity-assessing module further comprises means for assessing sensitivity of the predicted group price functions relative to price range restrictions.

25. A decision support system according to claim 1, wherein the sensitivity-assessing module further comprises means for assessing sensitivity of a single product merchandising parameter relative to price range restrictions.

26. A decision support system according to claim 1, wherein the sensitivity-assessing module further comprises means for assessing sensitivity of a group merchandising parameter relative to price range restrictions.

27. The decision support system as recited in claim 1 further comprising an optimization system for optimization of a selected merchandising parameter in promotion schedules that contains the following major modules:
 a) an initial scheduling module for constructing initial promotion schedules for the plurality of promotion clips running on the in-store monitors when there are no sufficient data for estimation of promotion schedule effects on the product demand;
 b) a promotion schedule estimation module for estimating effects of the plurality of promotion clips running on the in-store monitors on the product demand, based on said means for demonstrating the effects of display times of the plurality of promotion clips on the product demand in groups based on said means for estimation;
 c) a schedule selection module for selecting a group of schedules as best schedules from recorded optimal schedules;

d) a locally weighted regression module for constructing locally weighted regressions for the selected merchandising parameter in a vicinity of each of the best schedules;

e) a merchandising parameter module for computing merchandising parameter increases for all of the best schedules;

f) a local optimization module for performing local optimization of said selected merchandising parameter in the vicinity of all best schedules, and selecting one of the best schedules with a largest merchandising parameter increase;

g) a significance testing module that uses resampling methods for testing a significance of the largest merchandising parameter increase;

h) a promotion schedule module for constructing a next promotion schedule that either selects the schedule with the largest predicted merchandising parameter increase if the result of said significance testing was significant, or constructs a new promotion schedule in the vicinity of the existing promotion schedules.

28. A marketing decision support system as recited in claim 27, wherein the local optimization module is configured to allows incorporation of additional user-defined constraints including a number of brand item clips or a number of clip demonstrations related to a particular product group within a given time period.

29. The marketing decision support system as recited in claim 28, wherein, after computation completion, the promotion scheduling scenarios produce scenario reports that contain at least the following information units in tabled and graphical forms: scenario name, task specification—promotion, IDs of all monitors of the plurality of the monitors in the store, grouping mode for each monitor—individual or group, list of promotion clip IDs for each monitor, running time boundaries for each monitor, optimal running time distribution for all selected promotion clips for each monitor, all group profits, all group revenues, group availability, individual group product pricing, individual group product profits, individual group product revenues, individual group product sales volumes, and individual group product availability.

30. A marketing decision support system as recited in claim 27, further comprising an automatic promotion control system that controls functioning of the optimization module for an initial period and a main period.

31. A marketing decision support system as recited in claim 30, wherein said initial period contains a predefined finite number of working days.

32. A marketing decision support system as recited in claim 30, wherein said main period contains an unlimited number of working days.

33. The decision support system as recited in claim 1 further comprising user interface containing templates for a plurality of optimization and prediction scenarios partitioned into pricing optimization scenarios, pricing prediction scenarios, and promotion scheduling scenarios.

34. The marketing decision support system as recited in claim 33, wherein the user interface contains facilities for constructing the pricing optimization scenarios by entering parameter values or accepting system defaults via the following major steps: Select task—pricing, Select goal—optimization, Select figure-of-merit, i.e. revenue or profit, Select grouping mode—individual or group, Select pricing mode—regular or clearance, Select product categories, product groups, and products, Select scenario name, and Select execution mode—immediate or delayed.

35. The marketing decision support system as recited in claim 33, wherein the user interface contains facilities for constructing the pricing prediction scenarios by entering parameter values or accepting system defaults via the following major steps: select task—pricing, select goal—forecasting, select grouping mode—individual or group, select pricing mode—regular or clearance, select product categories, product groups, and products, select scenario name, and select execution mode—immediate or delayed.

36. The marketing decision support system as recited in claim 33, wherein the user interface contains facilities for constructing the promotion scheduling scenarios by entering various parameter values or accepting system defaults via the following major steps: select task—promotion, select the ID for each monitor from the plurality of all monitors in the store, select grouping mode—individual or group for each monitor, select a list of promotion clip IDs for each monitor, select running time boundaries for each monitor, select scenario name, and select execution mode—immediate or delayed.

37. The marketing decision support system as recited in claim 33, wherein, after computation completion, the pricing optimization scenarios produce scenario reports that contain at least the following information units in tabled and graphical forms: scenario task specification, all group profits, all group revenues, group availability, individual group task specification, individual group product pricing, individual group product profits, individual group product revenues, individual group product sales volumes, and individual group product availability.

38. The marketing decision support system as recited in claim 33, wherein, after computation completion, the pricing prediction scenarios produce scenario reports that contain at least the following information units in tabled and graphical forms: scenario task specification, all group forecasting terms, all group profits, all group revenues, group availability, individual group task specification, individual group product pricing, individual group product profits, individual group product revenues, individual group product sales volumes, and individual group product availability.

* * * * *